US010569871B2

(12) United States Patent
Chafe et al.

(10) Patent No.: US 10,569,871 B2
(45) Date of Patent: Feb. 25, 2020

(54) APPARATUS, DEVICE AND METHOD FOR AUTOMATED LAUNCH AND RECOVERY OF A KITE

(71) Applicant: Maritime Applied Physics Corporation, Baltimore, MD (US)

(72) Inventors: James Nathaniel Chafe, Annapolis, MD (US); Kevin Wade Silbert, Columbia, MD (US); Paul Charles Seiffert, Silver Spring, MD (US)

(73) Assignee: MARITIME APPLIED PHYSICS CORPORATION, Baltimore, MD (US)

( * ) Notice: Subject to any disclaimer, the term of this patent is extended or adjusted under 35 U.S.C. 154(b) by 304 days.

(21) Appl. No.: 15/698,537

(22) Filed: Sep. 7, 2017

(65) Prior Publication Data
US 2019/0071175 A1 Mar. 7, 2019

(51) Int. Cl.
*B64C 31/06* (2006.01)
*B64F 3/00* (2006.01)

(52) U.S. Cl.
CPC ............... *B64C 31/06* (2013.01); *B64F 3/00* (2013.01)

(58) Field of Classification Search
CPC .... B64C 31/06; B64F 1/08; B64F 3/00; B64F 3/02; B63B 35/7976; B63H 9/0685; A63H 27/08; F03D 5/00; F03D 5/02; F03D 5/04
See application file for complete search history.

(56) References Cited

U.S. PATENT DOCUMENTS

| 6,435,456 | B1 * | 8/2002 | Clawson | B64C 31/06 244/153 R |
| 7,287,481 | B1 | 10/2007 | Wrage et al. | |
| 7,775,483 | B2 | 8/2010 | Olson | |
| 7,866,271 | B2 * | 1/2011 | Wrage | B63H 9/0685 114/102.1 |
| 8,117,977 | B2 * | 2/2012 | Reusch | B63H 9/0685 114/39.29 |
| 8,602,363 | B2 * | 12/2013 | Larson | F03D 13/20 244/155 A |
| 8,888,049 | B2 * | 11/2014 | Vander Lind | B64C 31/06 244/153 R |
| 8,922,041 | B1 * | 12/2014 | North | G05D 1/08 290/44 |
| 8,975,771 | B2 * | 3/2015 | Goldstein | F03D 5/00 290/55 |
| 9,732,731 | B2 * | 8/2017 | Hachtmann | B64C 31/06 |
| 9,764,839 | B2 * | 9/2017 | Whitaker | B64D 1/18 |

(Continued)

FOREIGN PATENT DOCUMENTS

WO  WO-2008019700 A1 *  2/2008  ......... B63B 15/0083
WO  WO-2013164446 A1 *  11/2013  ......... B63H 9/0685

*Primary Examiner* — Joseph W Sanderson
(74) *Attorney, Agent, or Firm* — Loza & Loza, LLP

(57) ABSTRACT

A kite launch device that includes a kite, a mast, a guide device coupled to the mast, and a winch. The kite includes a canopy, a base structure for at least one device, a plurality of support lines coupled to the canopy and the base structure, a guide line coupled to the canopy, and a tether coupled to the base structure. The guide device is configured to grab the guide line. The winch is coupled to the tether of the kite. The winch is configured to extend and retract the tether. The kite includes a guide element coupled to the base structure and the guide line. The guide device is configured to encircle the guide element in order to grab the guide line.

30 Claims, 23 Drawing Sheets

(56) References Cited

U.S. PATENT DOCUMENTS

| | | | |
|---|---|---|---|
| 2007/0157868 A1* | 7/2007 | Wrage | B63H 9/0685 |
| | | | 114/365 |
| 2009/0266283 A1* | 10/2009 | Wrage | B63H 9/0685 |
| | | | 114/102.12 |
| 2010/0032949 A1* | 2/2010 | Varrichio | F03D 5/00 |
| | | | 290/44 |
| 2010/0032956 A1* | 2/2010 | Varrichio | F03D 5/00 |
| | | | 290/55 |
| 2010/0133385 A1* | 6/2010 | Olson | B64C 31/06 |
| | | | 244/155 A |
| 2011/0041747 A1* | 2/2011 | Reusch | B63H 9/0685 |
| | | | 114/39.11 |
| 2011/0272527 A1* | 11/2011 | Larson | F03D 13/20 |
| | | | 244/155 A |
| 2015/0048621 A1* | 2/2015 | Smeenk | F03D 5/06 |
| | | | 290/55 |
| 2016/0264260 A1* | 9/2016 | Hachtmann | B64C 31/06 |
| 2017/0043872 A1* | 2/2017 | Whitaker | B64D 1/18 |
| 2019/0177006 A1* | 6/2019 | Quick | B64F 3/00 |

* cited by examiner

APPARATUS, DEVICE AND METHOD FOR AUTOMATED LAUNCH AND RECOVERY OF A KITE

BACKGROUND

Field

Various features relate to an apparatus, device and method for automated launch and recovery of a kite.

Background

Kites may be used to lift heavy objects by capturing and harnessing forces from the wind. However, kites that are operated in this way often require mechanical winches to manage their tethers due to the large lifting forces from the wind. The launch and recovery of kites with large lifting forces can be dangerous to an operator during the ground handling phase, since the direction and/or strength of the winds can be very unpredictable. Thus, an operator that is attempting to manually launch and/or recover a kite puts themselves at great risk of injury or death, since a strong wind can cause the winch to spin uncontrollably and hurt the operator. However, automating a launch and/or recovery operation for a kite can be challenging due to many factors, including dealing with tangled lines of the kite and/or positioning the kite in the proper orientation.

FIG. 1 illustrates a kite 100 that includes a canopy 102, support lines 104 and a tether 106. The support lines 104 are coupled to the canopy 102 and the tether 106. As shown in FIG. 1, the support lines 104 are tangled, which is problematic because support lines that are tangled may cut and/or or break more easily due to the friction caused by lines in contact with each other. This is especially a problem when the kite 100 is subjected to very strong winds. In addition, tangled lines may prevent the kite 100 from properly launching since the tangled support lines 104 may prevent the canopy 102 from properly opening up to capture the wind. This can cause the kite 100 to crash, which may damage or destroy any object the kite 100 was attempting to lift.

As such, there is a need for an automated kite launch and recovery device that can safely and reliably launch and recover a kite, without the need of an operator holding on to the tether and/or without the need of an operator manually operating a mechanical winch coupled to the tether of the kite. Such an automated kite launch and recovery device may also be capable of stowing the kite when the kite is not in use.

SUMMARY

Various features relate to an apparatus, device and method for automated launch and recovery of a kite.

A first example provides a kite launch device that includes a kite, a mast, a guide device coupled to the mast, and a winch. The kite includes a canopy, a base structure for at least one device, a plurality of support lines coupled to the canopy and the base structure, a guide line coupled to the canopy, and a tether coupled to the base structure. The guide device is configured to grab the guide line. The winch is coupled to the tether of the kite. The winch is configured to extend and retract the tether.

In some implementations, the kite includes a guide element coupled to the base structure and the guide line. In some implementations, the guide device is configured to encircle the guide element in order to grab the guide line. In some implementations, at least one device comprises a sensor, a detector, a camera and/or an antenna. In some implementations, the winch includes a drum and a drive mechanism.

In some implementations, the tether includes at least one wire, at least one electrical wire, and/or at least one optical fiber. In some implementations, the guide device includes a first arm and a first arm latch such that the first arm and the first arm latch are configured to grab the guide line. In some implementations, the guide device further includes a second arm and a second arm latch such that the second arm and the second arm latch are configured to grab a second guide line.

In some implementations, the kite launch device includes a docking station configured to couple to a docking coupler of the kite, where the docking coupler is coupled to the tether. In some implementations, the docking station and the docking coupler are configured such that the kite is docked in a particular position when the kite is stowed.

A second example provides a method for launching a kite. The method positions, by a kite launch device, a kite comprising a canopy such that the canopy at least substantially faces a wind. The method determines, by a controller of the kite launch device, that the kite has substantially expanded. The method releases, by a guide device, a guide line of the kite. The method extends, by a winch, a tether coupled to the kite to launch the kite.

In some implementations, the method locks a winch so that the length of the tether is fixed. In some implementations, the method retracts the tether to retract the kite towards the kite launch device. In some implementations, the method grabs, by the guide device, the guide line of the kite. In some implementations, grabbing the guide line comprises grabbing a guide element of the kite. In some implementations, the method moves the guide line in an upwards direction by moving the guide device along a mast of the kite launch device to stow the kite. In some implementations, the guide device comprises an arm and an arm latch to grab and move the guide line. In some implementations, the tether is coupled to a docking coupler of the kite. In some implementations, the docking coupler is coupled to a docking station of the kite launch device prior to the guide device releasing the guide line. In some implementations, positioning the kite comprises rotating the guide device.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

Figure 1:
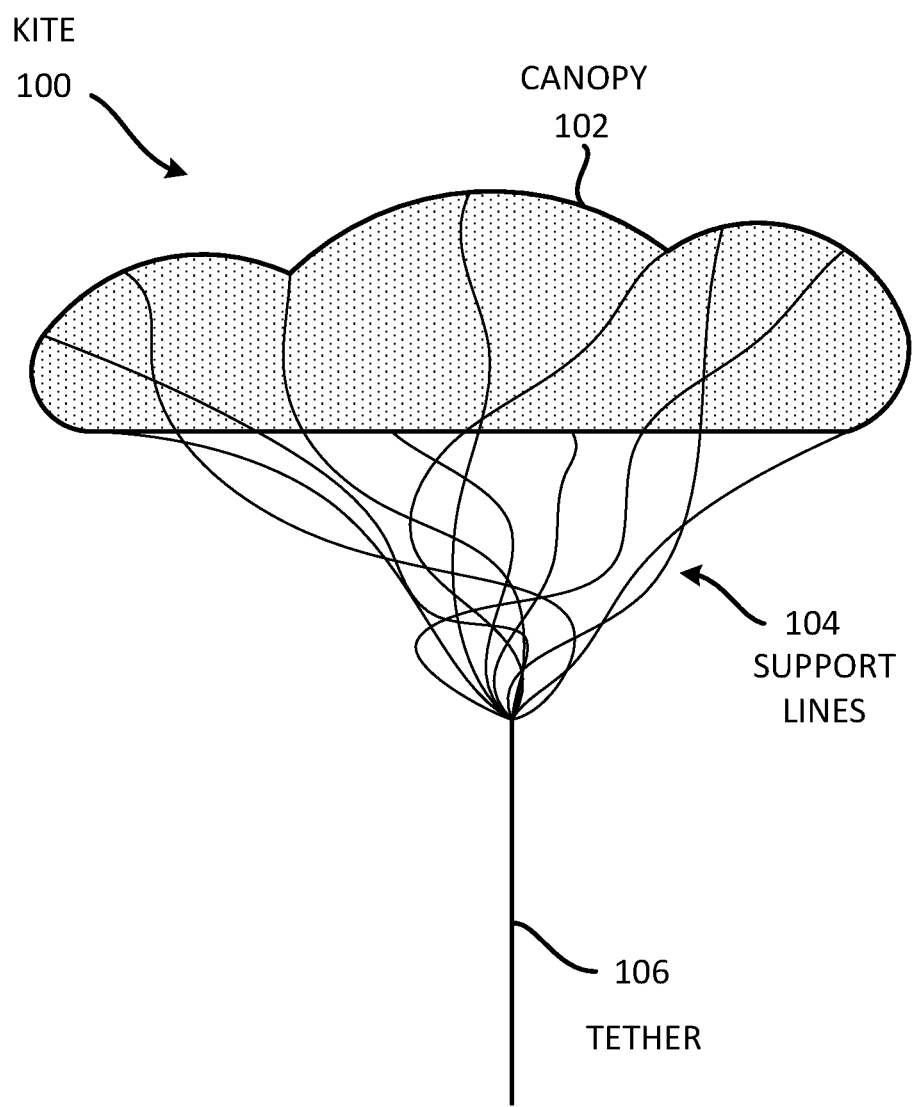
FIG. 1 illustrates a kite in an unexpanded position.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes a kite launch device that includes a kite, a mast, a guide device coupled to the mast, and a winch. The kite includes a canopy, a base structure for at least one device, a plurality of support lines coupled to the canopy and the base structure, a guide line coupled to the canopy, and a tether coupled to the base structure. The guide device is configured to grab the guide line. The winch is coupled to the tether of the kite. The winch is configured to extend and retract the tether. In some implementations, the kite includes a guide element coupled to the base structure and the guide line. In some implementations, the guide device is configured to encircle the guide element in order to grab the guide line. In some implementations, the at least one device comprises a sensor, a detector, a camera and/or an antenna. In some implementations, the winch includes a drum and a drive mechanism. In some implementations, the kite launch device includes a docking station configured to couple to a docking coupler of the kite, where the docking coupler is coupled to the tether. In some implementations, the docking station and the docking coupler are configured such that the kite is docked in a particular position when the kite is stowed. In some implementations, the tether includes at least one wire, at least one electrical wire, and/or at least one optical fiber. In some implementations, the guide device includes a first arm and a first arm latch such that the first arm and the first arm latch are configured to grab the guide line. In some implementations, the guide device further includes a second arm and a second arm latch such that the second arm and the second arm latch are configured to grab a second guide line.

The disclosure also describes a method for launching a kite in an automated manner. The method positions, by a kite launch device, a kite comprising a canopy such that the canopy at least substantially faces a wind. The method determines, by a controller of the kite launch device, that the kite has substantially expanded. The method releases, by a guide device, a guide line of the kite. The method extends, by a winch, a tether coupled to the kite to launch the kite.

In some implementations, the method locks a winch so that the length of the tether is fixed. In some implementations, the method retracts the tether to retract the kite towards the kite launch device. In some implementations, the method grabs, by the guide device, the guide line of the kite. In some implementations, grabbing the guide line comprises grabbing a guide element of the kite. In some implementations, the method moves the guide line in an upwards direction by moving the guide device along a mast of the kite launch device to stow the kite. In some implementations, the guide device comprises an arm and an arm latch to grab and move the guide line. In some implementations, the tether is coupled to a docking coupler of the kite. In some implementations, the docking coupler is coupled to a docking station of the kite launch device prior to the guide device releasing the guide line. In some implementations, positioning the kite comprises rotating the guide device.

Exemplary Kite Launch and Recovery Device

Figure 2:
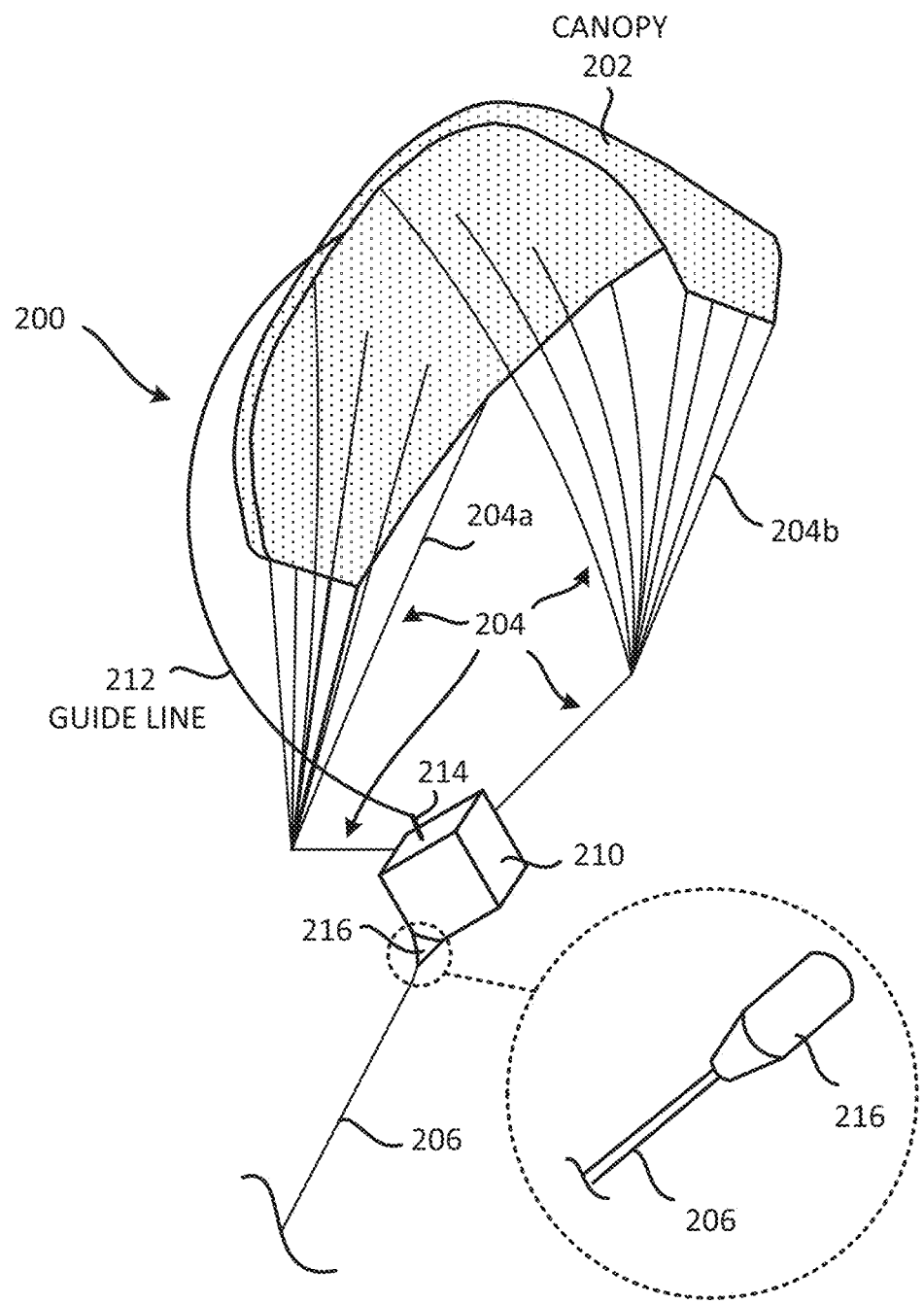
FIG. 2 illustrates a kite in a launched position.

FIG. 2 illustrates a kite 200 that may be used to lift devices, objects and/or items. In some implementations, the kite 200 may be used to lift devices such as instruments, sensors, detectors, communication devices, positioning devices (e.g., GPS) cameras, antennas (e.g., radio antennas) to an altitude where they are able function with an improved line-of-sight perspective. The improved line-of-sight may enhance the operation of the device (e.g., sensor, detector, camera, antenna). For example, the improved line-of-sight may increase the communications range of a radio or may allow a camera to capture objects that cannot be seen from lower elevations. The kite 200 may also be used to capture wind power and generate electricity or propel vehicles such as boats and ships with the captured wind power.

As shown in FIG. 2, the kite 200 includes a canopy 202, support lines 204, a tether 206, a base structure 210, a guide line 212, a guide element 214, and a docking coupler 216. The support lines 204 (e.g., one or more support lines, plurality of support lines) include a first plurality of support lines 204a and a second plurality of support lines 204b. The support lines 204 are coupled to the canopy 202 and the base structure 210. In particular, the first plurality of support lines 204a and the second plurality of support lines 204b are coupled to the base structure 210. Different implementations may use a canopy 202 with different sizes and/or shapes. In some implementations, the canopy 202 has the shape of a parasail or parafoil. Different implementations may use different materials for the canopy 202. For example, the canopy 202 may include a rigid material, a fabric, a flexible membrane, and/or combinations thereof.

The base structure 210 is shown as a square shape box. However, the base structure 210 may have different shapes (e.g., rectangular, circular) and/or sizes. For example, the base structure 210 may include one or more frame components. The base structure 210 may be a compartment (e.g., open compartment, closed compartment) that can provide storage and/or structural support for one or more devices. Examples of devices that can be coupled to the base structure 210 include sensors, detectors, processors, cameras and/or antennas. The above list of devices is exemplary. Other types of devices may also be coupled to, or enclosed in the base structure 210.

The guide element 214 is coupled to the base structure 210. The guide line 212 is coupled the guide element 214 and the canopy 202. In some implementations, the guide line 212 may be coupled to the base structure 210. In some implementations, the guide element 214 and the guide line 212 may help the kite 200 properly launch during an automated kite launch operation. The use of the guide line 212 and/or the guide element 214 will be further described below in at least FIG. 3. It is noted that the guide line 212 is different than support lines 204. The guide line 212 is used for launching and recovering the kite 200. When the kite 200 has launched, the guide line 212 does not play a role in the operation of the kite 200. However, the support lines 204 provide support for the canopy 202 and the base structure 210 when the kite 200 has launched. The support lines 204 may also provide support for the canopy 202 and the base structure 210 prior to the kite 200 being launched.

FIG. 2 also illustrates a docking coupler 216 coupled to the base structure 210. The docking coupler 216 may be considered part of the base structure 210 or a separate component from the base structure 210. The docking coupler 216 is also coupled to the tether 206. In some implementations, the tether 206 may be coupled to the base structure 210. As will be further described below in FIG. 3, the docking coupler 216 may be configured to ensure that the base structure 210 docks properly with a kite launch and recovery device, when the kite 200 is retracted to be stowed during an automated recovery operation. In some implementations, the docking coupler 216 has a particular shape that ensures the base structure 210 will rest or dock in a particular position or orientation with a kite launch and recovery device. The use of the docking coupler 216 is further described below in at least FIGS. 3 and 4.

Figure 3:
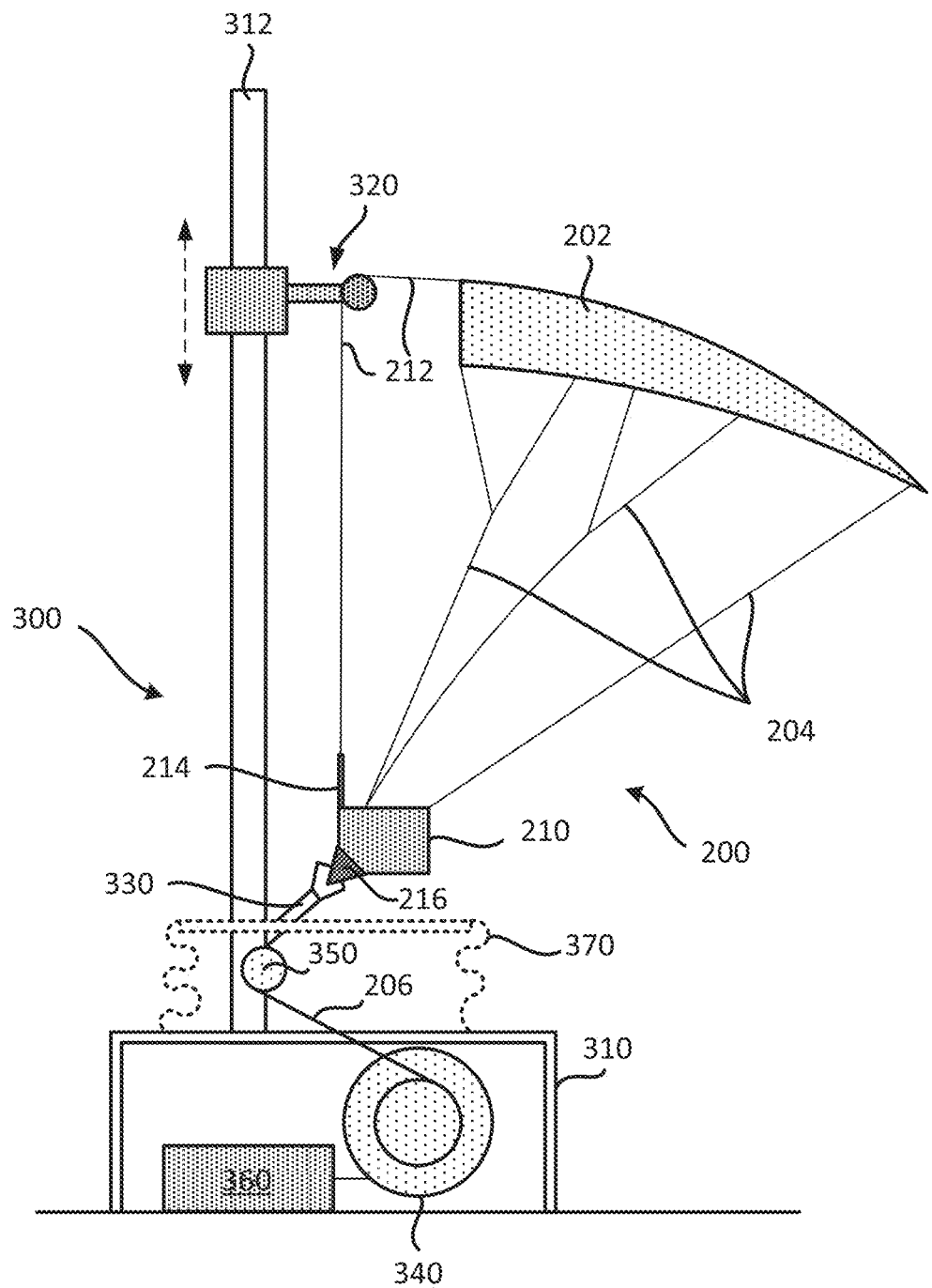
FIG. 3 illustrates a kite launch and recovery device.

FIG. 3 illustrates a kite launch and recovery device 300 that can launch and recover a kite in an automated manner. In some implementations, the kite launch and recovery device 300 may be referred to as a kite launch device or a kite recovery device. In some implementations, the kite launch and recovery device 300 may include the kite 200 as described in FIG. 2. The kite launch and recovery device 300 may be implemented in different structures, aircrafts, vessels and/or vehicles. For example, the kite launch and recovery device 300 may be implemented on a car, truck, boat or ship.

The kite launch and recovery device 300 includes a base 310, a mast 312, a guide device 320, a docking station 330, a winch 340, a pulley 350, and a controller 360. The kite launch and recovery device 300 may also include a shroud 370. The shroud 370 may be used to stow the kite 200 when the kite 200 is not in use. The shroud 370 may include different materials, sizes and/or shapes. In some implementations, the shroud 370 may include a fabric, a rigid material, a flexible material, and/or combinations thereof.

As shown in FIG. 3, the mast 312 is coupled to the base 310. The guide device 320 is coupled to the mast 312. Examples of the guide device 320 are further described below in at least FIGS. 6-10. The guide device 320 is configured to grab the guide line 212 and help launch and recover the kite 200. The guide device 320 is also configured to stow the kite 200 after the recovery operation of the kite 200. The guide device 320 may move along the length of the mast 312 (e.g., move up and down the mast 312). Thus, the guide device 320 is moveable along the mast 312. Different mechanisms may be used to move the guide device 320 along (e.g., up and down) the mast 312. Examples of different mechanisms are described in FIGS. 11 and 12. The guide device 320 or parts of it may rotate about the mast 312 (e.g., the guide device 320 is rotatable about the mast 312). In some implementations, the kite launch and recovery device 300 may be positioned on a platform that can be rotated (e.g., lazy susan platform). For example, the base 310 may be positioned on a platform that can be rotated. In some implementations, the mast 312 and/or the base 310 can be rotated. In some implementations, the mast 312 may be collapsible. In some implementations, the mast 312 may be a telescoping mast.

The base structure 210 is coupled (e.g., docked) to the docking station 330 through the docking coupler 216. As mentioned above the docking coupler 216 may be separate or part of the base structure 210. The tether 206 is coupled to the docking coupler 216. The tether 206 may travel through the docking station 330. The tether 206 is coupled to the winch 340 through the pulley 350. The winch 340 may include motor(s), pulley(s) and/or gears. The motor(s), pulley(s) and/or gears may be part of a drive mechanism for the winch 340. In some implementations, the winch 340 may include a drum and a brake to lock or prevent the winch 340 from rotating (e.g., winch 340 is in a locked configuration).

The winch 340 pulls or releases (which may be controlled by the drive mechanism) the tether 206, which in turn may pull the kite 200 towards the docking station 330 or release the kite 200 from the docking station 330. The winch 340 may be controlled by the controller 360. The controller 360 may include one or more processors that control the drive mechanism (e.g., motor) of the winch 340. An example of the controller 360 is described in more detail in FIG. 13. In some implementations, sensors may be coupled to the winch 340, the tether 206 and/or the kite 200 to provide information about the position of the kite 200. Examples of sensors, include sensors that provide information on the length of the tether 206 and/or tension in the tether 206, which helps with the automation of the kite launch and recovery device 300.

The tether 206 may include one or more wires. One or more of the wires may include tensile fibers. The wires may include electrically non-conducting material. The tether 206 may include electrical wires that are capable of providing one or more electrical paths for power and/or signals to the base structure 210 and/or the devices (e.g., sensor, detector, camera) coupled to the base structure 210. In some implementations, the tether 206 may include optical fibers that are capable of transmitting signals to and from the kite 200. In some implementations, the tether 206 may include an electrical elements that can be configured as an antenna for radio signal transmission and/or reception.

FIG. 3 illustrates the winch 340 and the controller 360 located in the base 310. However, different implementations may position the winch 340 and/or the controller 360 in different locations. FIG. 3 also illustrates one guide element and one guide line. However, some implementations may include more than one guide element and more than one guide line (e.g., first guide element coupled to a first guide line, second guide element coupled to a second guide line). In some implementations, several guide elements and several guide lines may help keep the canopy 202 and the support lines 204 more organized and prevent the support lines 204 from being tangled, allowing the kite 200 to launch more easily and reliably.

Figure 4:
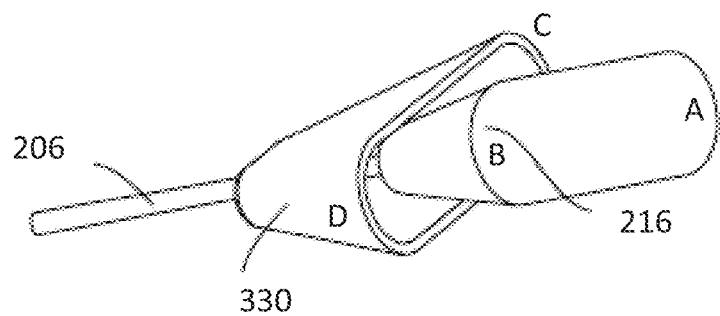
FIG. 4 illustrates a close up view of a dock of a kite launch and recovery device.

FIG. 4 illustrates a close up view of the docking coupler 216 being coupled to the docking station 330. The docking coupler 216 has particular shape so that the docking coupler 216 will couple (e.g., dock) to the docking station 330 in a particular manner or position from a set of possible positions (e.g., 3 or less possible positions, only one possible position, limited possible degrees of freedom). In some implementations, this ensures that the base structure 210 docks in a particular position when the kite 200 is stowed. FIG. 4 illustrates that the A side of the docking coupler 216 is oriented to couple to C side of the docking station 330, and the B side of the docking coupler 216 is oriented to couple to D side of the docking station 330. In some implementations, the A side of the docking coupler 216 is oriented to couple to D side of the docking station 330, and the B side of the docking coupler 216 is oriented to couple to C side of the docking station 330. In some implementations, the docking coupler 216 is coupled to (e.g., docked to) the docking station 330 when the docking coupler 216 can no longer substantially move or substantially change position and/or orientation. In some implementations, this may be referred to as the docked position or locked position.

FIG. 4 illustrates that the docking coupler 216 and the docking station 330 have an oval shape. However, different implementations may use different shapes and/or sizes for the docking coupler 216 and/or the docking station 330.

Having described an example of the kite launch and recovery device 300 and the kite 200, an example of the operation of the kite launch and recovery device 300 and the kite 200 will now be described below.

Exemplary Sequence of a Kite Launch and Recovery Device in Operation

FIG. 5 (which includes FIGS. 5A-5K) illustrates an exemplary sequence of a kite launch and recovery device in operation. In some implementations, the sequence of FIGS. 5A-5K illustrates the kite launch and recovery device 300 of FIG. 3.

It is noted that the sequence of FIGS. 5A-5K may combine one or more stages in order to simplify and/or clarify the sequence shown in FIGS. 5A-5K. In some implementations, the order of the sequence of the operation may be changed or modified.

Figure 5A:
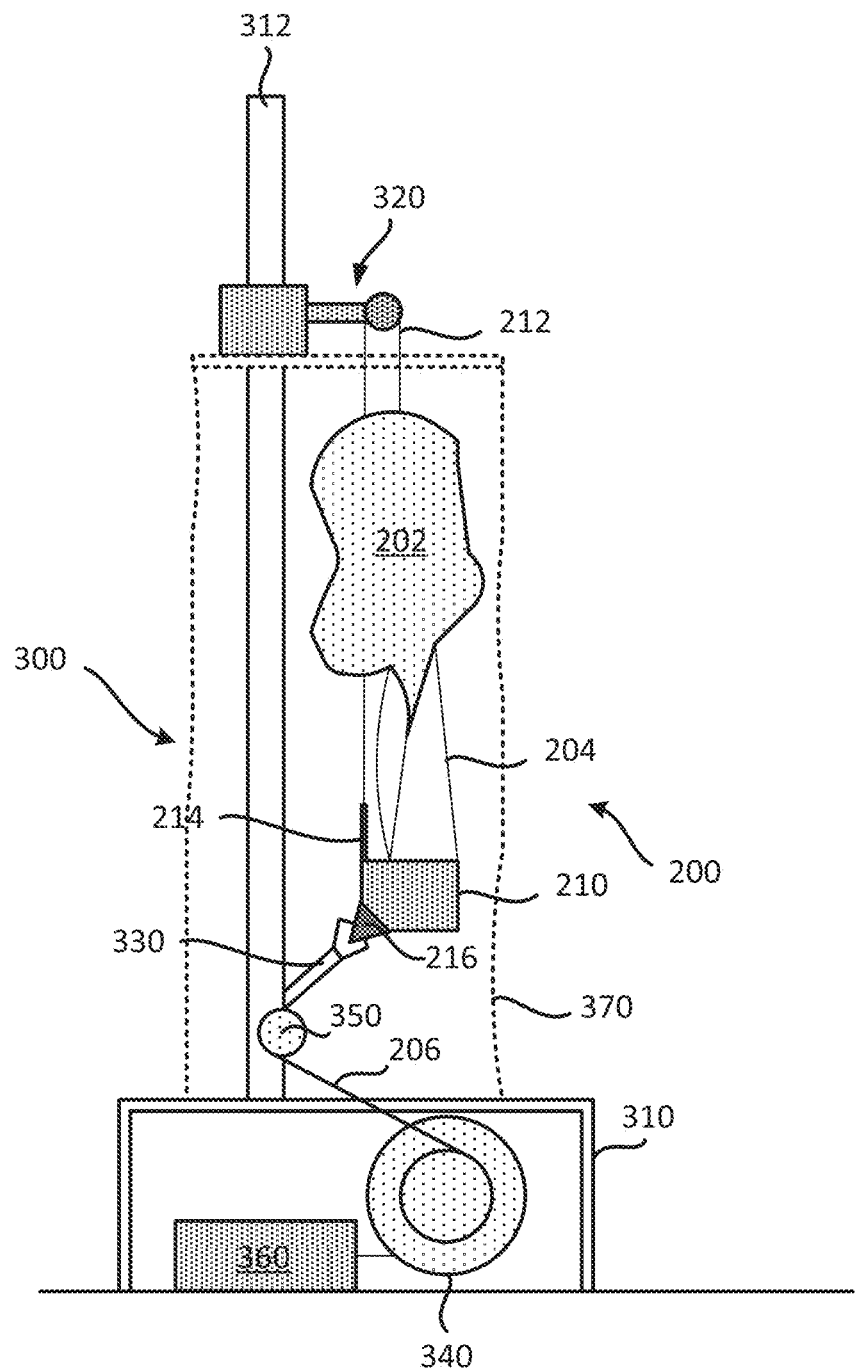
FIG. 5 (which includes FIGS. 5A-5K) illustrates a kite launch and recovery device at various states.

FIG. 5A illustrates a state when the kite launch and recovery device 300 is in a stowed configuration. As shown in FIG. 5A, the shroud 370 is pulled up and at least partially covers the kite 200, thereby protecting the kite 200 from the environment. A pulley device (not shown) may be used to pull the shroud 370 up and down along the mast 312. The pulley device may be coupled to a motor (not shown) that drives the shroud 370 up and down the mast 312.

It is noted that in some implementations, the kite 200 and/or the kite launch and recovery device 300 may be protected or covered differently. For example, the kite launch and recovery device 300 may be located in an enclosure, and the kite launch and recovery device 300 is raised above the enclosure, which exposes the kite 200 and the kite launch and recovery device 300 to the environment.

FIG. 5A also illustrates the base structure 210 being coupled to the docking station 330. More specifically, the base structure 210 is coupled to the docking station 330 through the docking coupler 216.

Figure 5B:
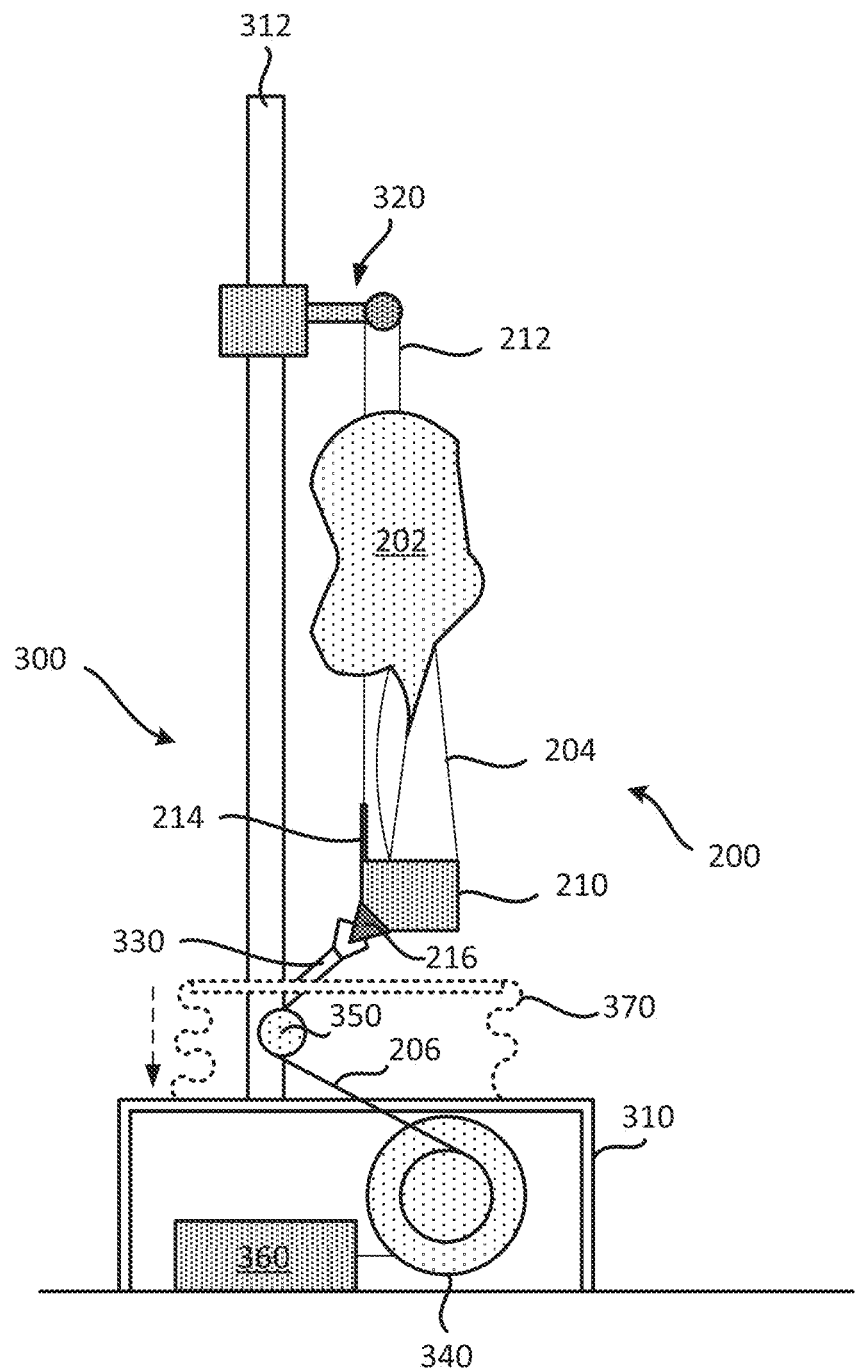

FIG. 5B illustrates a state after the shroud 370 is in a retracted position. In this state, the kite 200 is exposed to the environment and can be launched. The shroud 370 has been lowered from its position shown in FIG. 5A.

In some implementations, FIG. 5B may also illustrate a state after the kite 200 has been oriented in such a way as to catch the wind. For example, the kite launch and recovery device 300 may have been rotated in such a way that the kite 200 is at least substantially parallel to the wind and/or facing the wind. In some implementations, the guide device 320 and/or the docking station 330 may rotate in such a way that the kite 200 is at least substantially parallel to the wind and/or facing the wind. In some implementations, the mast 312 may rotate about the base 310 to align the kite in a proper direction relative to the wind. In some implementations, the above components may be rotated by using a rotation mechanism. The rotation mechanism may include one or more motors. The rotation mechanism may be located in different parts of the kite launch and recovery device 300. For example, the rotation mechanism may be located in the guide device 320 and/or the base 310. In some implementations, the kite launch and recovery device 300 may be on and/or over the rotation mechanism (e.g., rotation platform). The rotation mechanism may be part of the kite launch and recovery device 300 or a separate component. In some implementations, one or more wind sensors (e.g., wind direction sensor, wind strength sensor) may be used to help the kite launch and recovery device 300 and/or the guide device 320 properly align the kite 200 (e.g., canopy 202) so that the kite 200 can be properly launched and/or be properly recovered. Thus, the guide device 320 and/or the kite 200 may be rotated by rotating the guide device 320, rotating the mast 312, rotating the base 310, and/or rotating the kite launch and recovery device 300.

FIG. 5B also illustrates that the guide device 320 is grabbing the guide line 212, which suspends the canopy 202 in a way that the canopy 204 can be stowed or be launched. In addition, when the guide device 320 grabs the guide line 212, the support lines 202 are less likely to get tangled to each other. This in turn, makes launching of the kite 200 much easier. In some implementations, there may be several guide lines and several guide elements. In some implementations, the number of guide lines and guide elements may depend on the size of canopy 202 and/or how many support lines 204 there are in the kite 200.

Figure 5C:
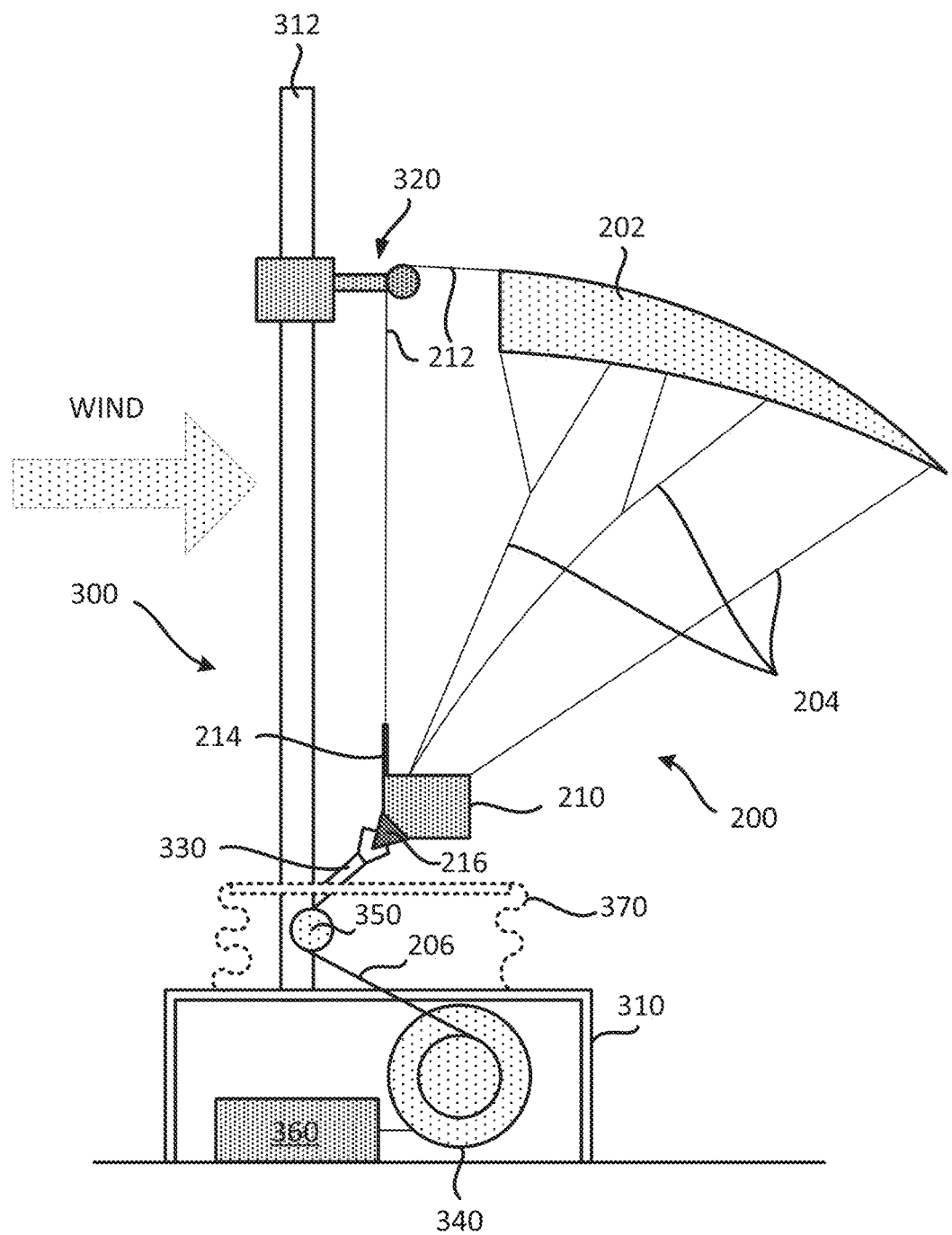

FIG. 5C illustrates a state after the canopy 202 has caught a wind and has expanded (e.g., deployed). The support lines 204 are taut since the base structure 210 is still coupled to the docking station 330. The tether 206 holds the base structure 210 to the docking station 330. The winch 340 is in a locked configuration and prevents the tether 206 from extending, which in turn prevents the base structure 210 and the kite 200 from flying off. In some implementations, one or more sensors may be used to determine whether the support lines 204 are taut or not. In some implementations, the winch 340 may be in a locked configuration until there is enough tension in the support lines 204 and/or the tether 206. For example, the kite launch and recovery device 300 may wait until there is a minimum amount of tension in the winch 340, the tether 206 and/or the support lines 204 before releasing the winch 340 from the locked configuration. In some implementations, the minimum amount of tension in the winch 340, the tether 206 and/or the support lines 204 indicates that the canopy 202 is substantially deployed (e.g., is substantially expanded and/or inflated) and the kite 200 is ready to be launched. In some implementations, the kite launch and recovery device 300 may rotate the kite 200 until the kite has caught a wind.

Figure 5D:
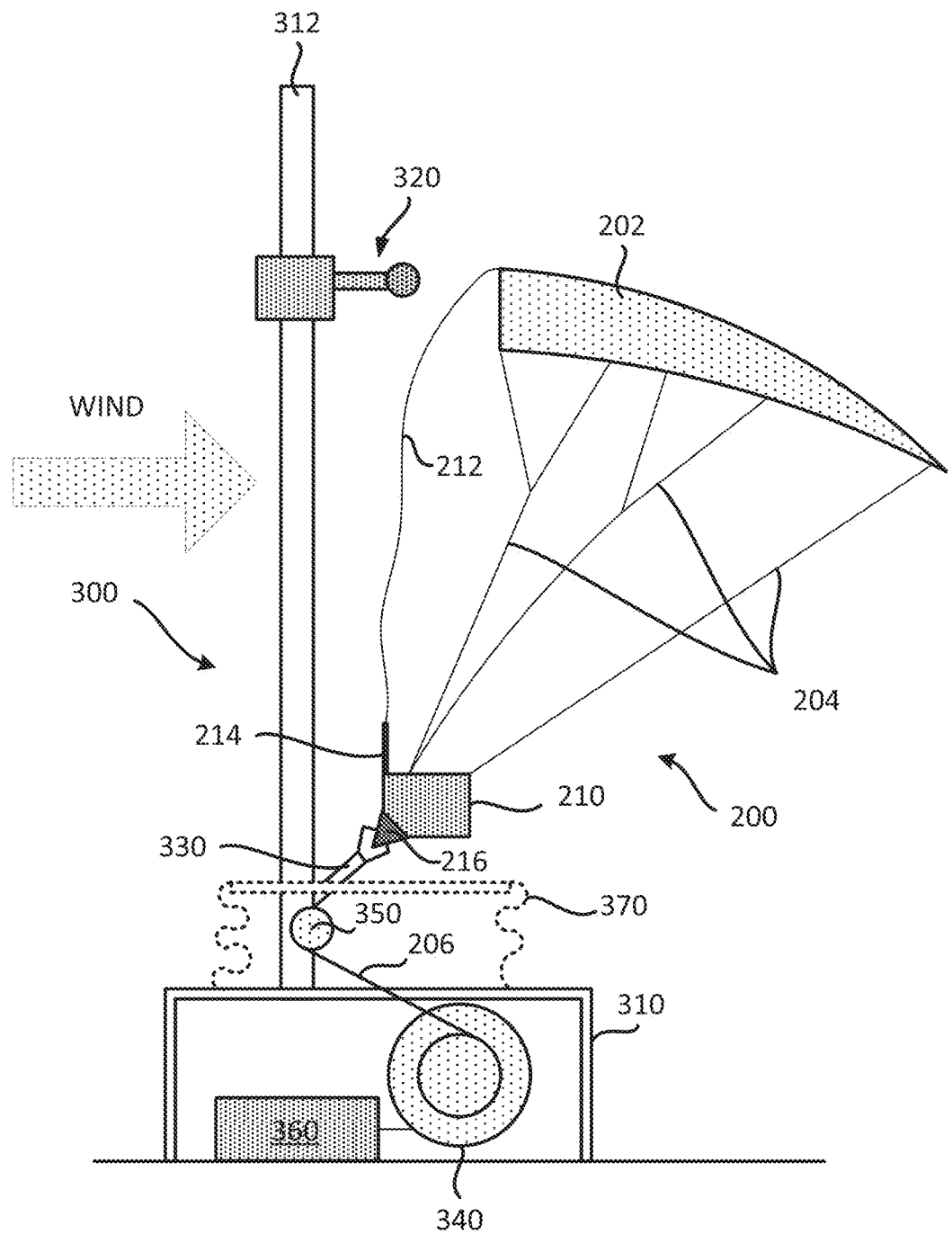

FIG. 5D illustrates a state after the guide device 320 has released the guide line 212. In some implementations, the guide device 320 releases the guide line 212 after the kite launch and recovery device 300 determines there is a minimum amount of tension in the winch 340, the tether 206 and/or the support lines 204. In some implementations, the minimum amount of tension may correspond to about the amount of weight the kite 200 is trying to lift. However, different implementations may specify different conditions for the minimum amount of tension. In some implementations, the minimum amount of tension may be less, equal, or more than the amount of weight the kite 200 is designed to lift.

Figure 5E:
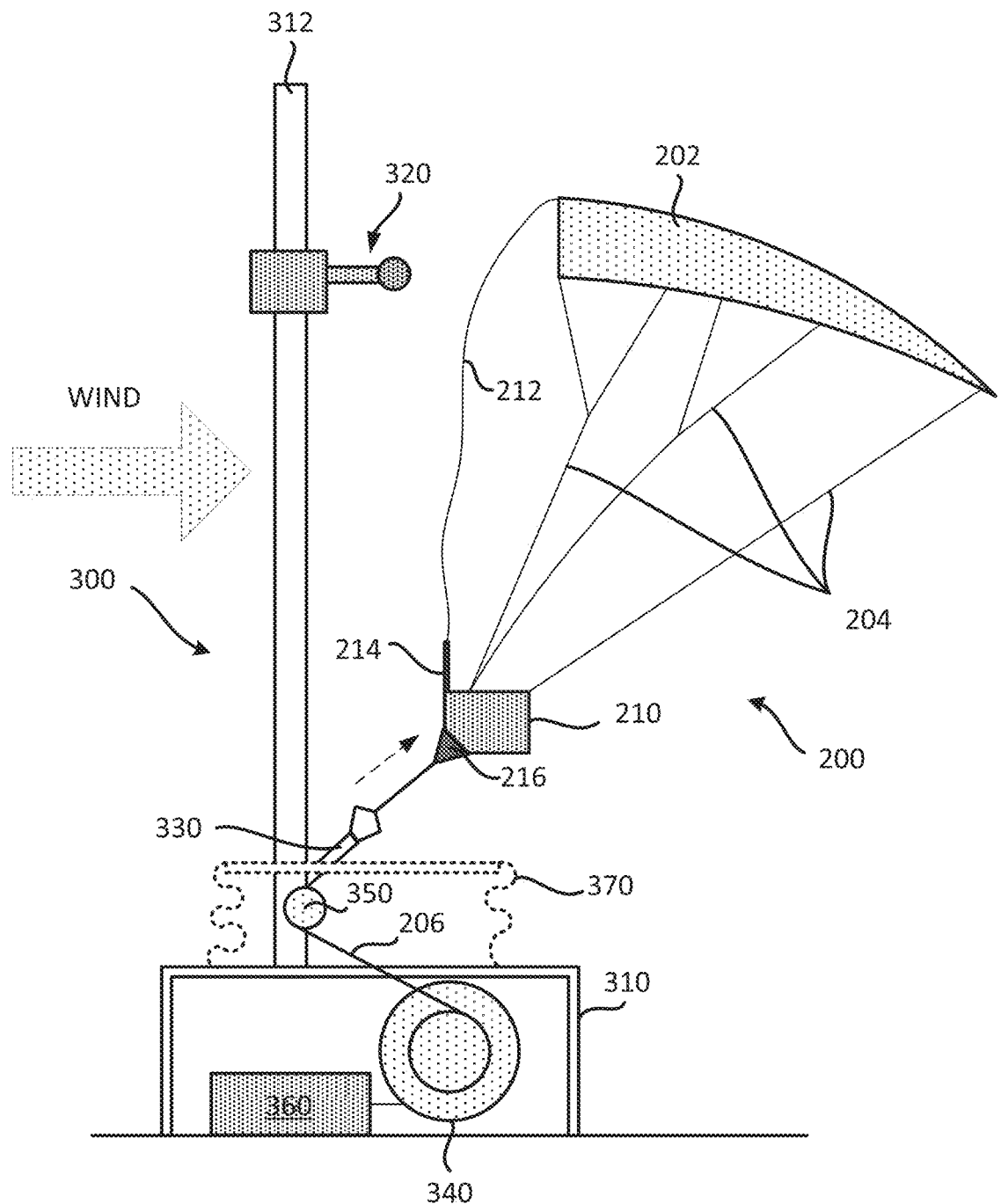

FIG. 5E illustrates a state after the winch 340 releases the tether 206, which allows the kite 200 to be launched. As shown in FIG. 5E, the winch 340 unwinds the tether 206. This results in the docking coupler 216 being decoupled from the docking station 330. As the tether 206 unspools from the winch 340, the wind launches the kite 200 away from the kite launch and recovery device 300 (e.g., away from the mast 312, away from the docking station 330). FIG. 5E illustrates the winch 340 in an open configuration, allowing the kite 200 to controllably fly away. In some implementations, the winch 340 is unspooling or unwinding in a controlled speed. That is, the kite 200 may be allowed to gradually fly away in a controlled manner, even if the wind is strong enough to lift the kite 200 at a faster rate.

Figure 5F:
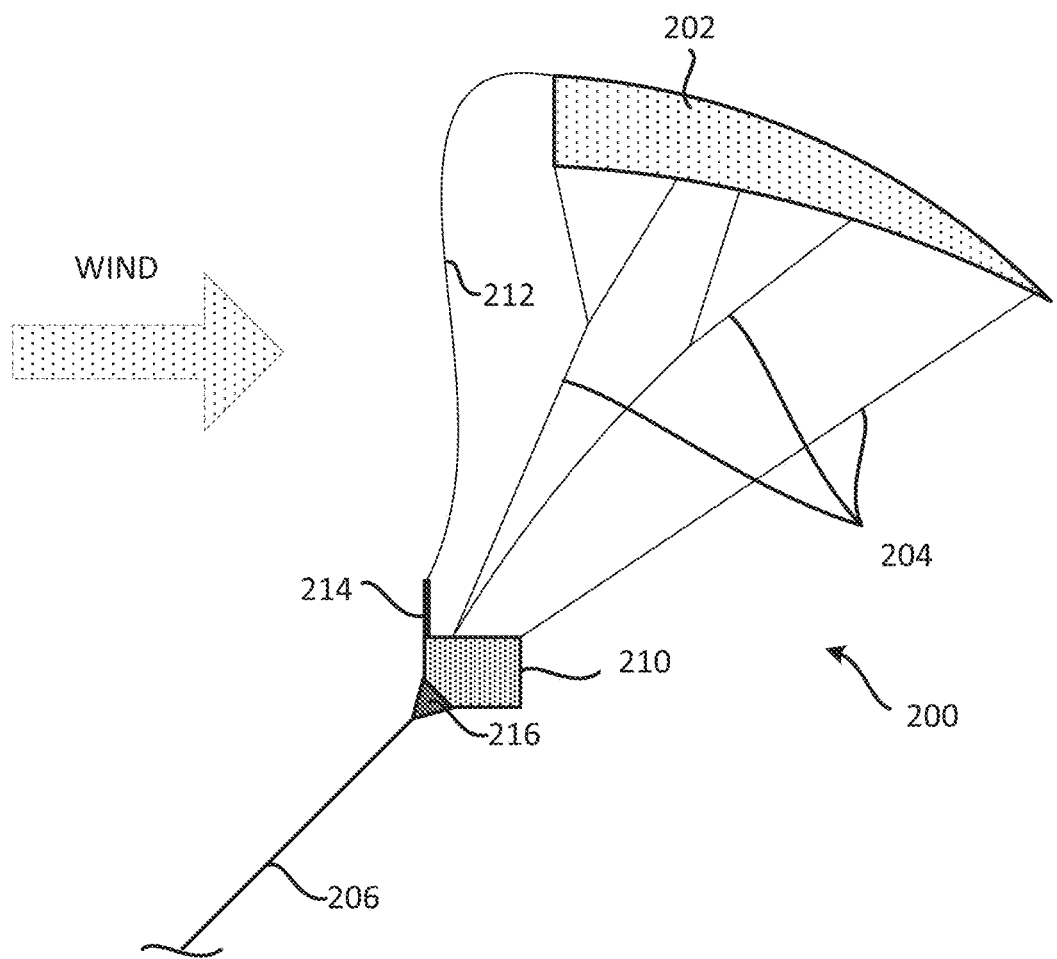

FIG. 5F illustrates a state after the kite 200 has been launched. At this state, the winch 340 may be in a locked configuration, which means the tether 206 is no longer being extended. At this state, the guide line 212 may freely move around without interfering with the lift of the kite 200. At this state, one or more of the devices and/or components on the base structure 210 may be operational. For example, a camera may begin capturing pictures and/or videos. In some implementations, sensors may begin to collect information. In some implementations, the one or more devices (e.g., sensors) may be operational before the kite 200 has fully launched. For example, devices may collect and/or process information continuously (e.g., before, during and/or after a launch, before, during and/or after a recovery).

Figure 5G:
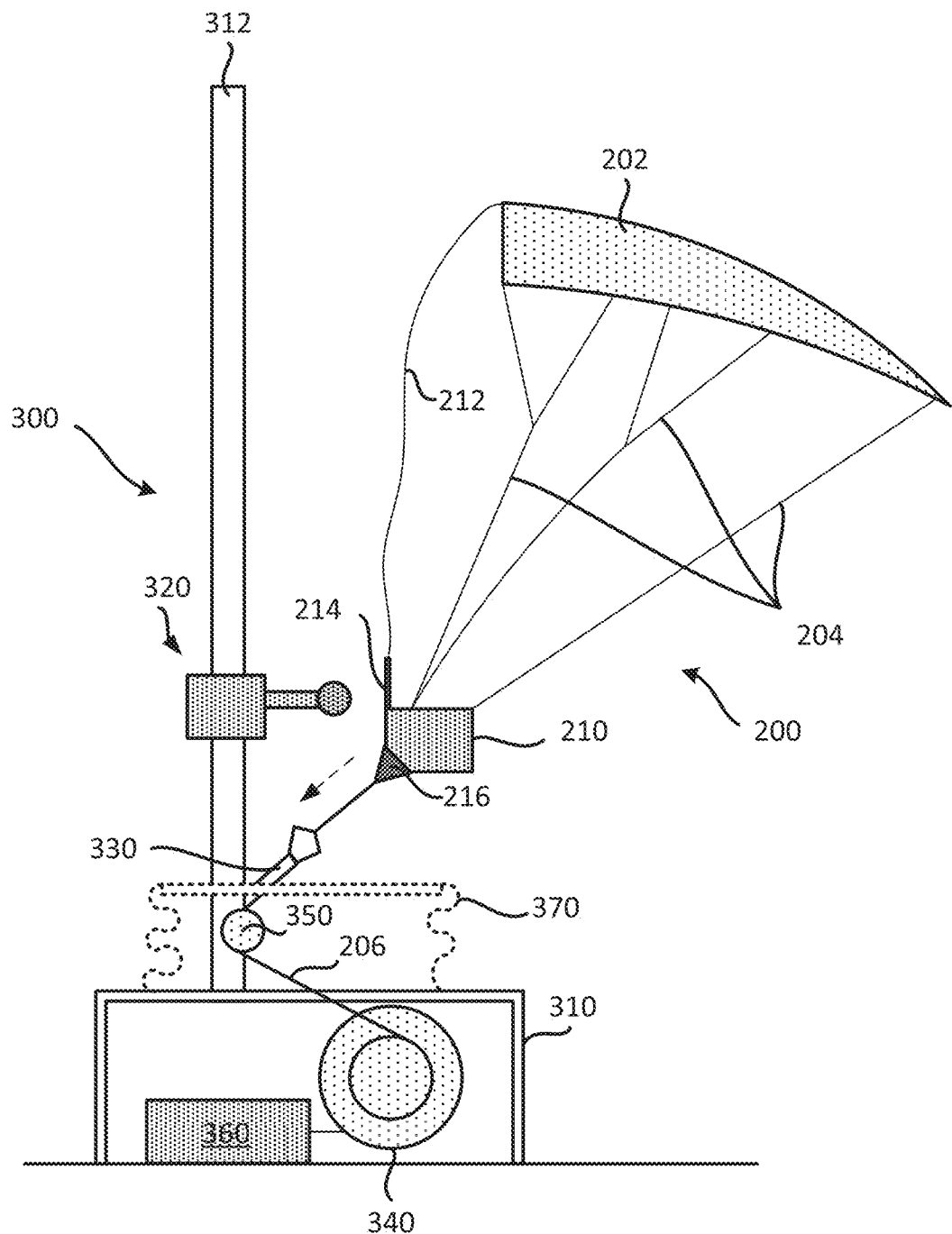

FIG. 5G illustrates a state after the kite 200 is being recovered. At this state, the winch 340 pulls the kite 200 back towards the docking station 330. The winch 340 pulls the kite 200 by retracting the tether 206. One or more of the devices of the base structure 210 may be collecting information or has stopped collecting information while the kite 200 is being retracted. FIG. 5G illustrates that the guide device 320 is in a lowered position. The guide device 320 may be lowered prior to the kite 200 being retracted or while the kite 200 is being retracted.

Figure 5H:
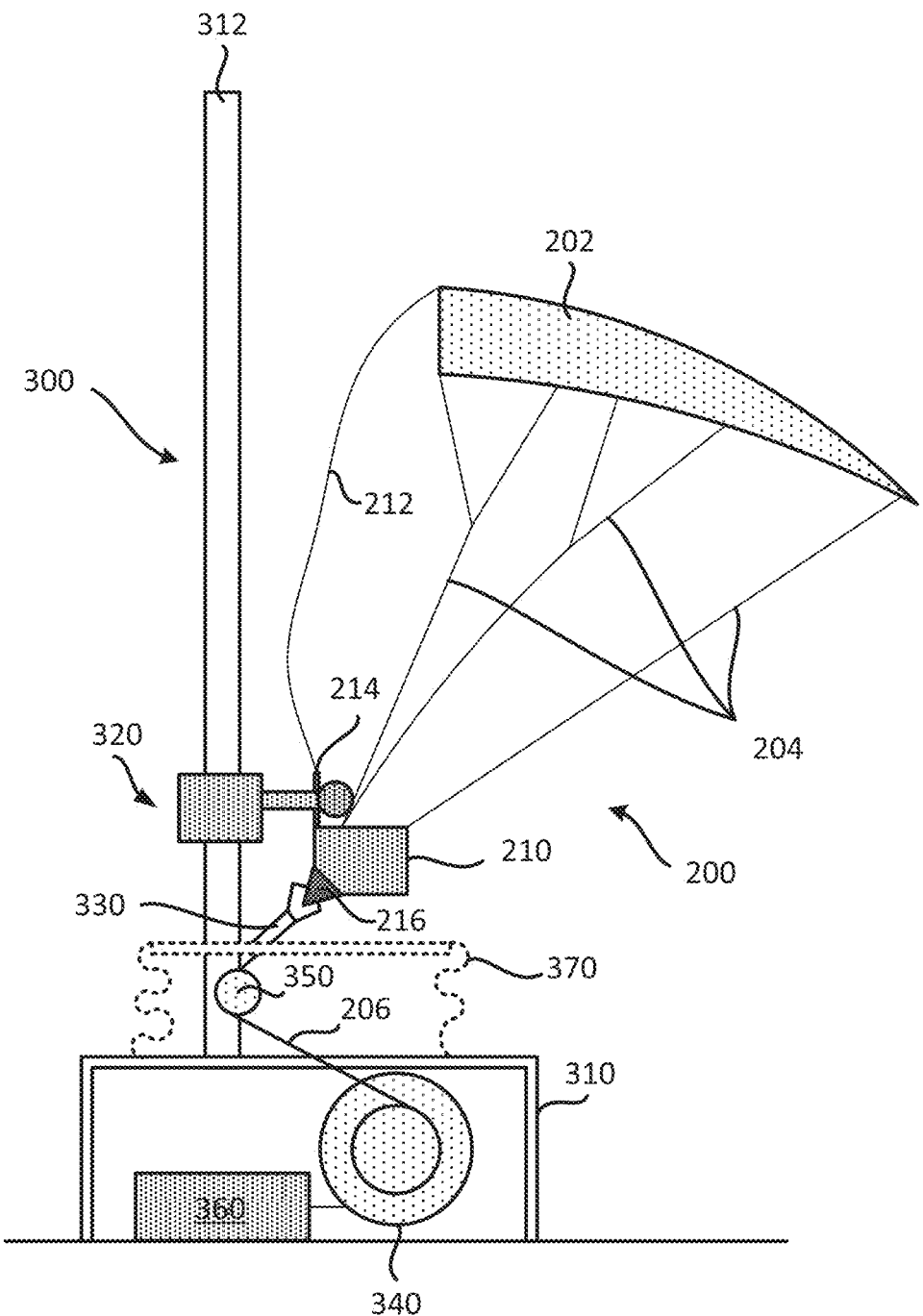

FIG. 5H illustrates a state after the kite 200 has been coupled to the docking station 330. In particular, FIG. 5H illustrates the base structure 210 being coupled to the docking station 330 through the docking coupler 216. In some implementations, once the kite 200 has been coupled to the docking station 330, the winch 340 is in a locked configuration, preventing the kite 200 from launching. In some implementations, the winch 340 may be locked by a brake that is coupled to a drum of the winch 340.

FIG. 5H also illustrates the guide device 320 grabbing the guide element 214 in order to grab the guide line 212. Since the guide line 212 can move around, the guide element 214 helps the guide device 320 grab the guide line 212 because the guide element 214 will always be in a fixed position. So while the guide line 212 may flop around in the wind, the guide element 214 will be fixed. Moreover, during this state, since the support lines 204 are at least substantially taut, the support lines 204 will not get in the way of the guide device 320 grabbing the guide element 214 and/or the guide line 212. The guide element 214 may include a rigid component, a flexible component, and/or combinations thereof. The guide element 214 may be long enough so that the guide device 320 can encircle or grab the guide element 214. In some implementations, the length of the guide element 214 may be similar or greater than the height of an arm of the guide device 320. FIGS. 6, 7, 8, 9 and 10 illustrate examples of guide devices that can be configured to grab the guide element 214 and/or the guide line 212.

Figure 5I:
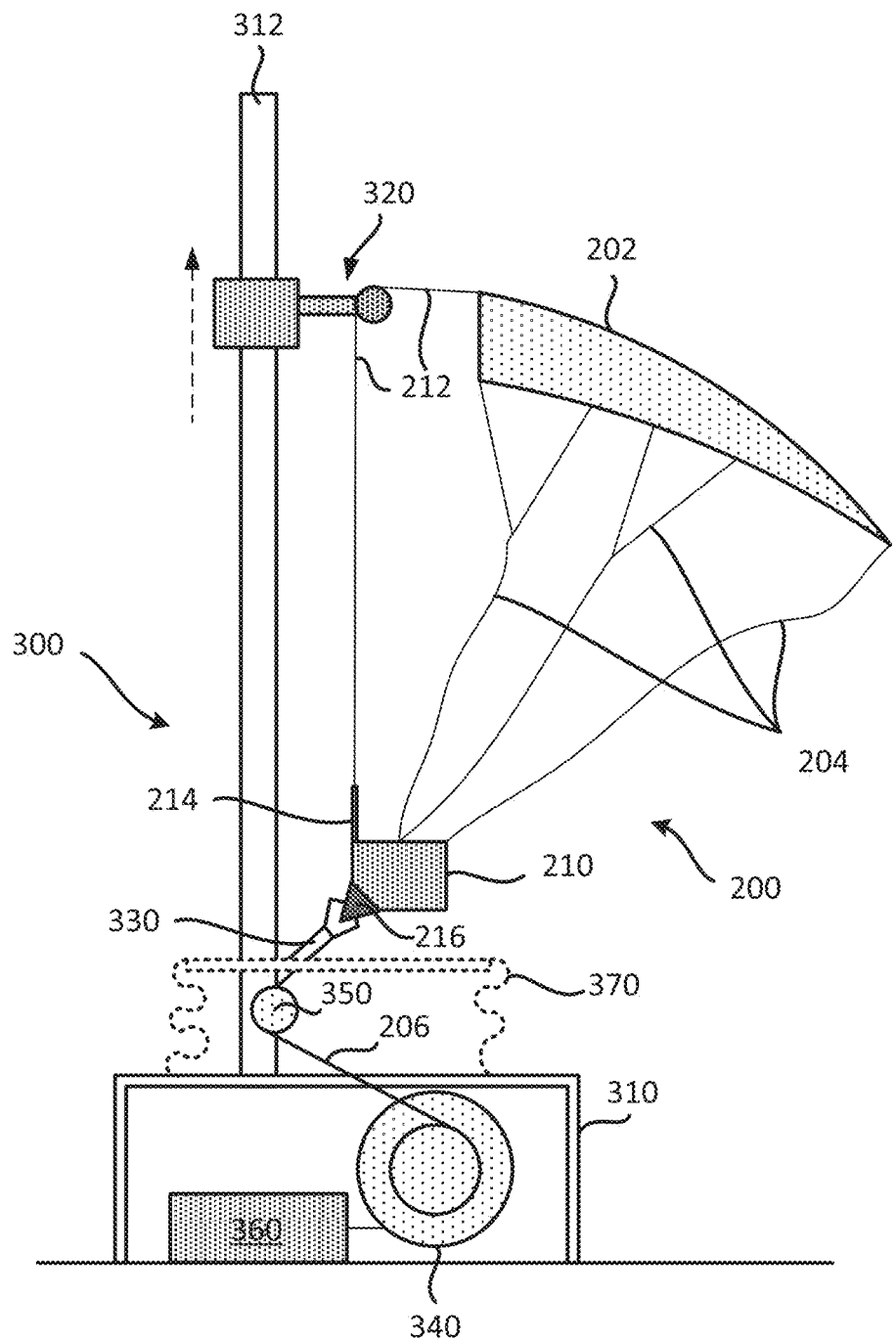

FIG. 5I illustrates a state after the guide device 320 moves up the mast 312 after grabbing the guide element 214 and/or the guide line 212. In some implementations, the support lines 204 may be taut or loose. The canopy 202 may be fully opened (e.g., fully deployed, fully expanded) or partially opened.

Figure 5J:
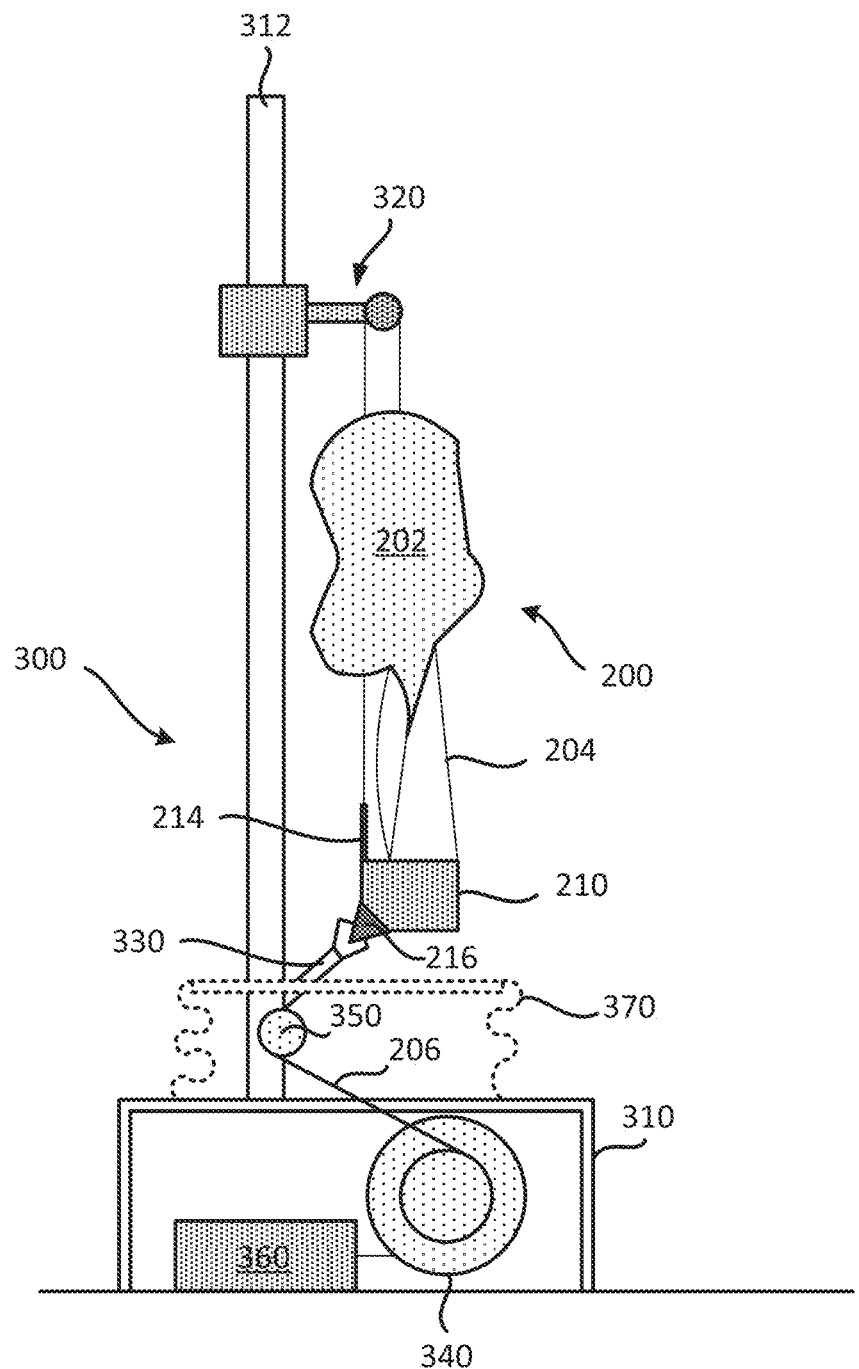

FIG. 5J illustrates a state after the canopy 202 has collapsed and is hanging from the guide line 212. This may happen after the wind has died down, allowing the canopy 202 to hang from the guide device 320. In some implementations, the kite 200 (e.g., canopy 202) may be rotated so that wind does not expand the canopy, which would allow the canopy to collapse. The kite 200 may be rotated by rotating the guide device 320, the mast 312, the base 310 and/or the kite launch and recovery device 300. As mentioned above, some implementations may use more than one guide line and/or more than one guide element. In such instances, the canopy 202 may hang from several guide lines and/or several guide elements. Moreover, the guide device 320 may be configured to grab more than one guide line and/or more than one guide element.

Figure 5K:
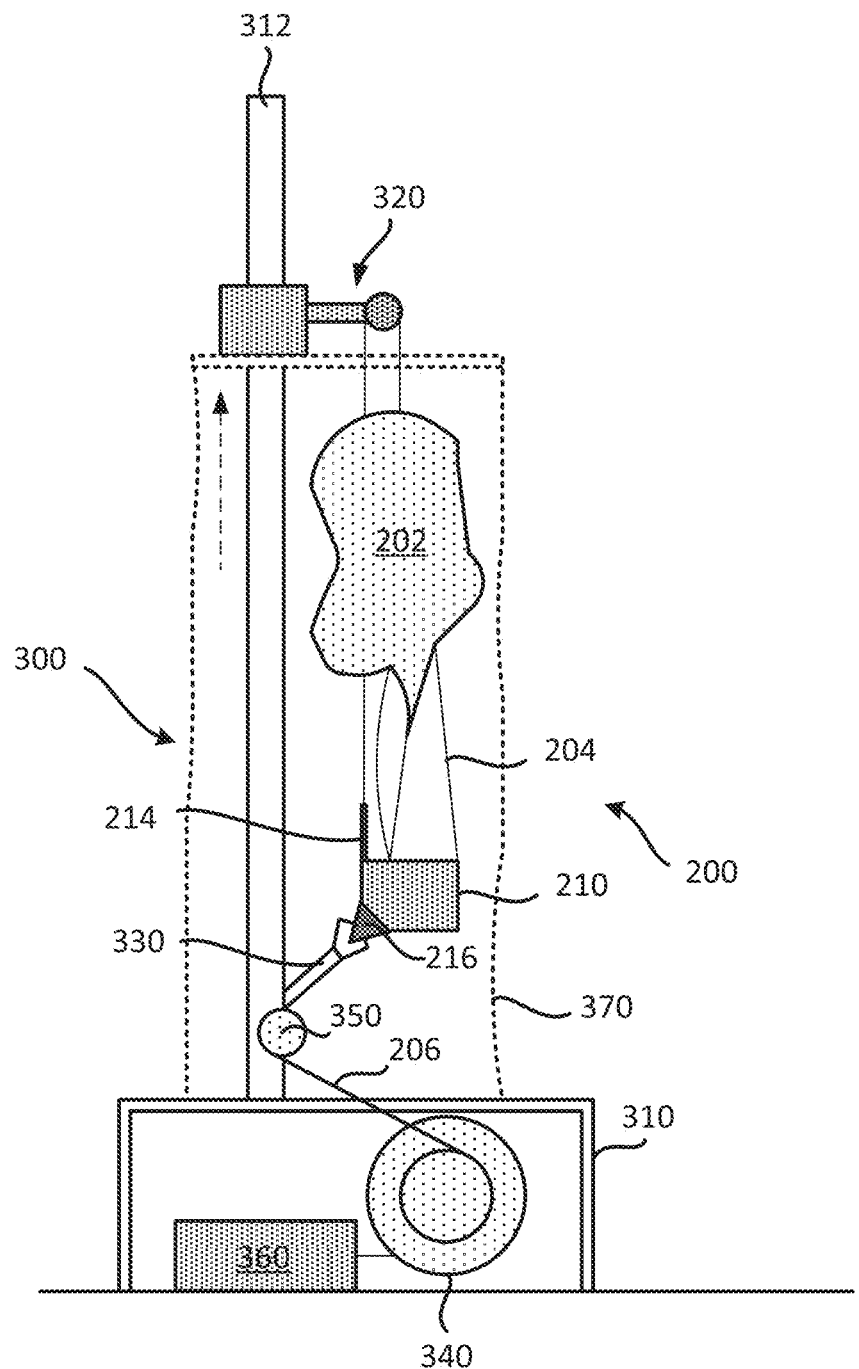

FIG. 5K illustrates a state after the shroud 370 has moved up the mast 312 to at least partially cover the kite 200. In some implementations, a pulley device is used to move the shroud 370. Different implementations may use different devices for moving the shroud 370. In some implementations, the kite launch and recovery device 300 may be positioned in an enclosure (e.g., lowered in an enclosure) to provide protection for the kite 200. The above sequence and/or operation may be repeated several times in an automated manner to launch and recover a kite.

Having described how the kite launch and recovery device 300 may operate in an automated manner, detailed examples of guide devices used with the kite launch and recovery device will now be described below.

Exemplary Guide Devices for A Kite Launch and Recovery Device

Figure 6:
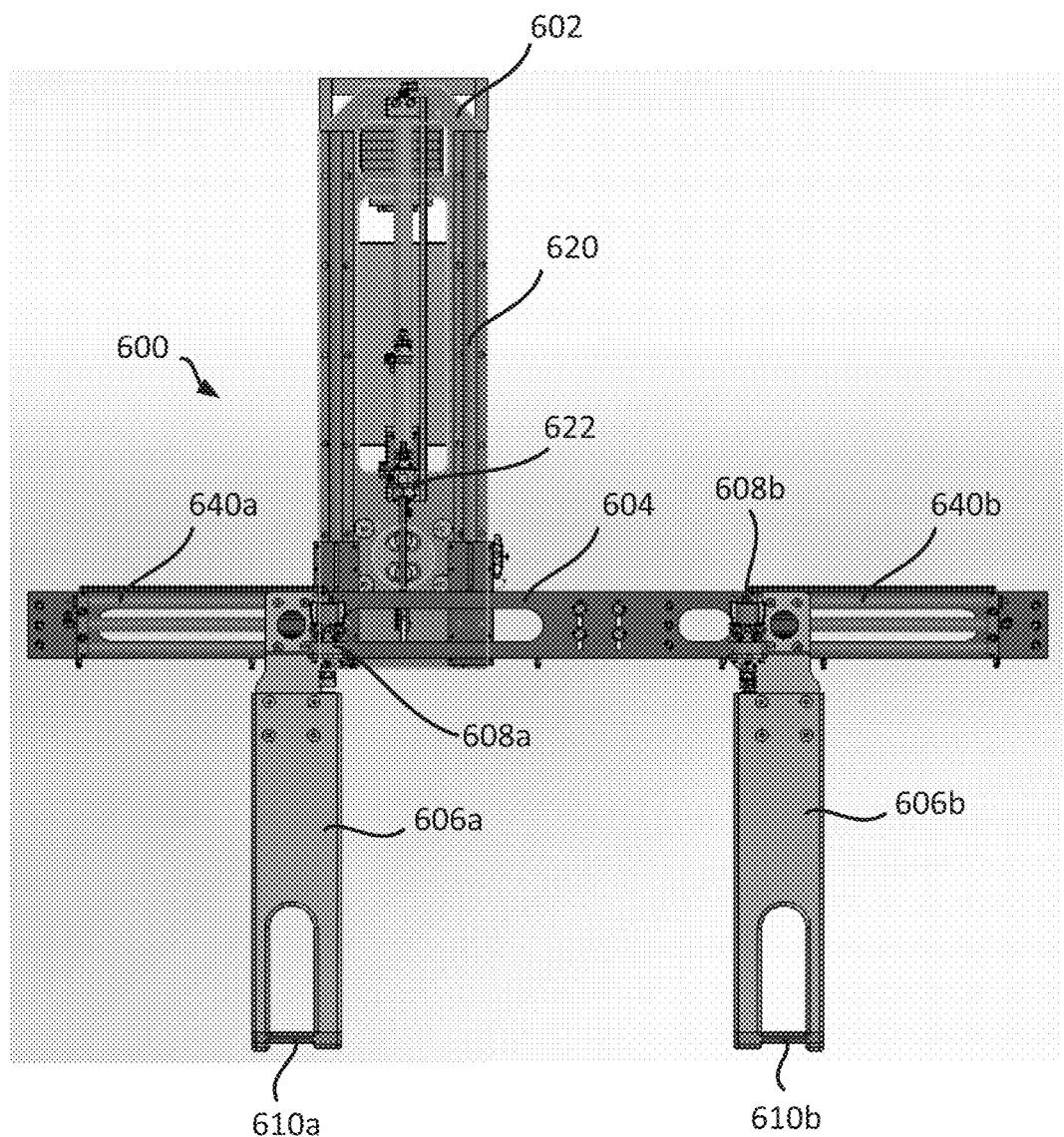
FIG. 6 illustrates a kite guide device of a kite launch and recovery device.

FIG. 6 illustrates an example of a guide device 600 that can be implemented with a kite launch and recovery device. In some implementations, the guide device 600 is an implementation of the guide device 320.

The guide device 600 includes a first frame 602, a second frame 604, a first arm 606a, a second arm 606b, a first motor 608a, a second motor 608b, a first arm latch 610a, and a second arm latch 610b. The first frame 602 includes a first rail 620 and a third motor 622. The second frame 604 includes a second rails 640a and 640b.

The second frame 604 is coupled to the first frame 602 through the first rail 620. In some implementations, the second frame 604 may move along the first rail 620 through the use of the third motor 622. The first frame 602 may be coupled to the mast 312 in some implementations.

The first arm 606a is coupled to the second rail 640a, and the second arm 606b is coupled to the second rail 640b. In some implementations, the first arm 606a moves along the second rail 640a through the use of the first motor 608a. In some implementations, the second arm 606b moves along the second rail 640b through the use of the second motor 608b.

The first arm 606a is coupled to the first arm latch 610a, and the second arm 606b is coupled to the second arm latch 610b. The first arm latch 610a may open or close, allowing the first arm 606a to grab or release an object (e.g., guide line 212, guide element 214). Similarly, the second arm latch 610b may open or close, allowing the second arm 606b to grab or release an object (e.g., guide line 212, guide element 214). The first arm latch 610a and/or the second arm latch 610b may be closed or opened by using one or more actuators and/or one or more motors.

Figure 7:
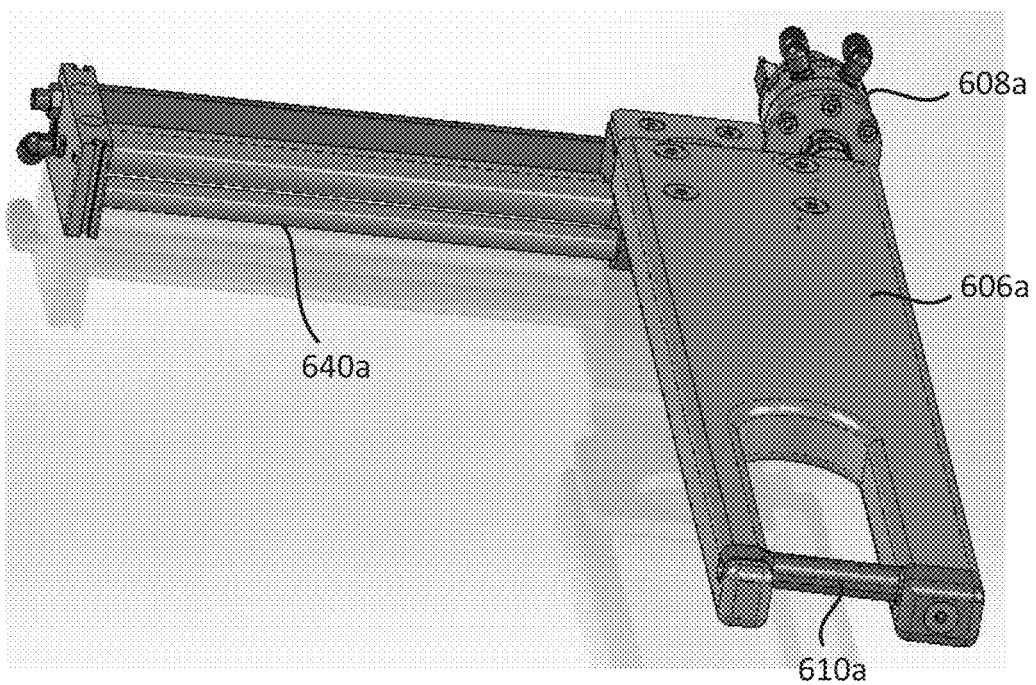
FIG. 7 illustrates an arm of a kite guide device in a closed configuration.

FIG. 7 illustrates the first arm latch 610a in a closed position. When the first arm latch 610a is in a closed position, a guide element or guide line is grabbed or encircled, allowing the guide device to move the guide line to a proper position.

Figure 8:
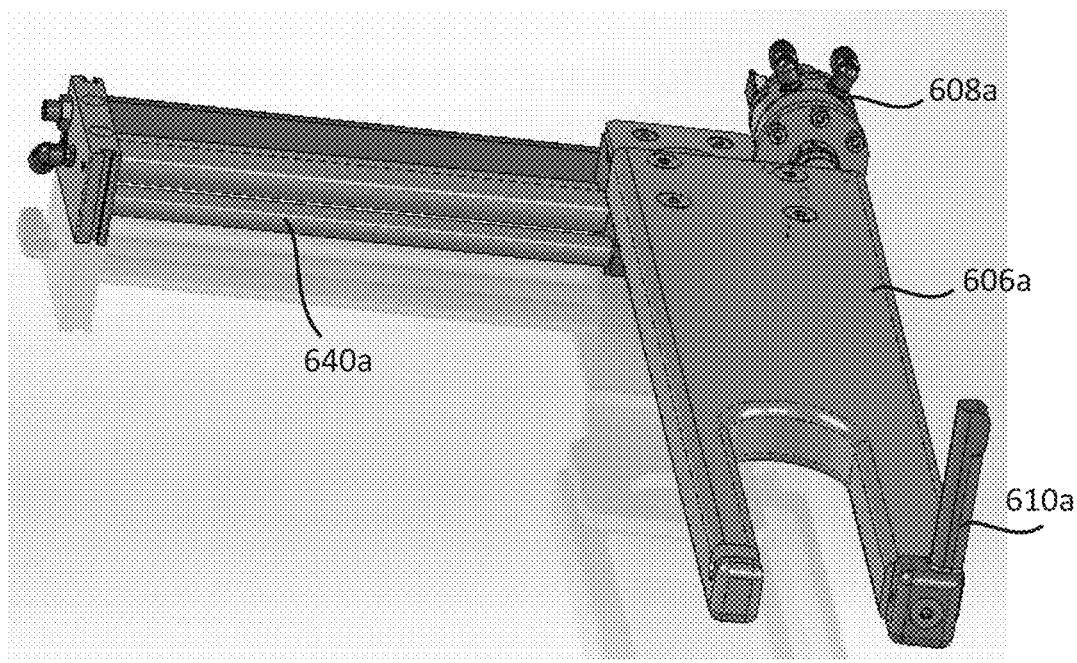
FIG. 8 illustrates an arm of a kite guide device in an open configuration.

FIG. 8 illustrates the first arm latch 610a in an open position. When the first arm latch 610a is in an open position a guide element or guide line can be grabbed or encircled through the opening.

Figure 9:
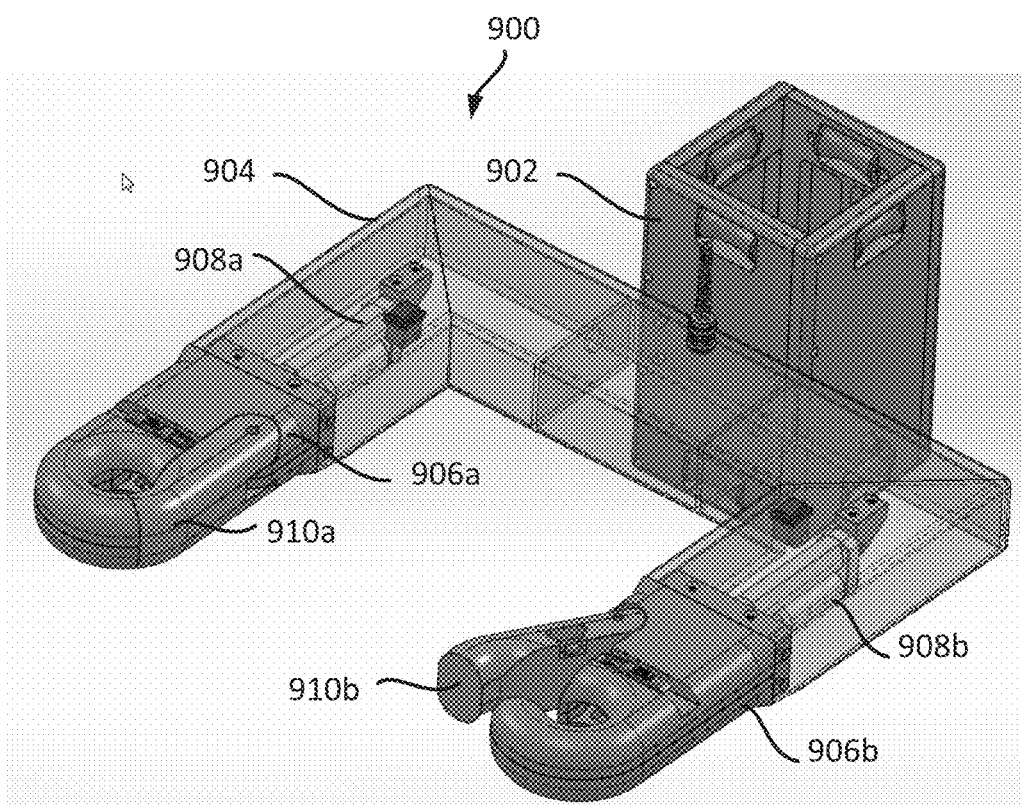
FIG. 9 illustrates another kite guide device of a kite launch and recovery device.

FIG. 9 illustrates another example of a guide device 900 that can be implemented with a kite launch and recovery device. In some implementations, the guide device 900 is an implementation of the guide device 320.

The guide device 900 includes a first frame 902, a second frame 904, a first arm 906a, a second arm 906b, a first actuator 908*a*, a second actuator 908*b*, a first arm latch 910*a*, and a second arm latch 910*b*. The first frame 902 may be coupled to the mast 312. The first frame 902 may include bearings, which allow the first frame 902 to move along the mast 312 in a smooth manner.

The second frame 904 is coupled to the first frame 902. The first arm 906*a* and the second arm 906*b* are coupled to the second frame 904. The first arm latch 910*a* is coupled to the first arm 906*a*, and the second arm latch 910*b* is coupled to the second arm 906*b*. The first arm latch 910*a* is coupled to the first actuator 908*a*, and the second arm latch 910*b* is coupled to the second actuator 908*b*. The first actuator 908*a* and the second actuator 908*b* are coupled to the second frame 904.

The first arm latch 910*a* may open or close, allowing the first arm 906*a* to grab or release an object (e.g., guide line 212, guide element 214). Similarly, the second arm latch 910*b* may open or close, allowing the second arm 906*b* to grab or release an object (e.g., guide line 212, guide element 214). The first arm latch 910*a* and/or the second arm latch 910*b* may be closed or opened by using their respective actuators. For example, the first arm latch 910*a* may be closed or opened by using the first actuator 908*a*, and the second arm latch 910*b* may be closed or opened by using the second actuator 908*b*.

FIG. 9 illustrates that the first arm 906*a* is in a closed position, while the second arm 906*b* is in an open position. The first arm 906*a* is in a closed position because the first arm latch 910*a* is closed, while the second arm 906*b* is in an open position because the second arm latch 910*b* is open.

Figure 10:
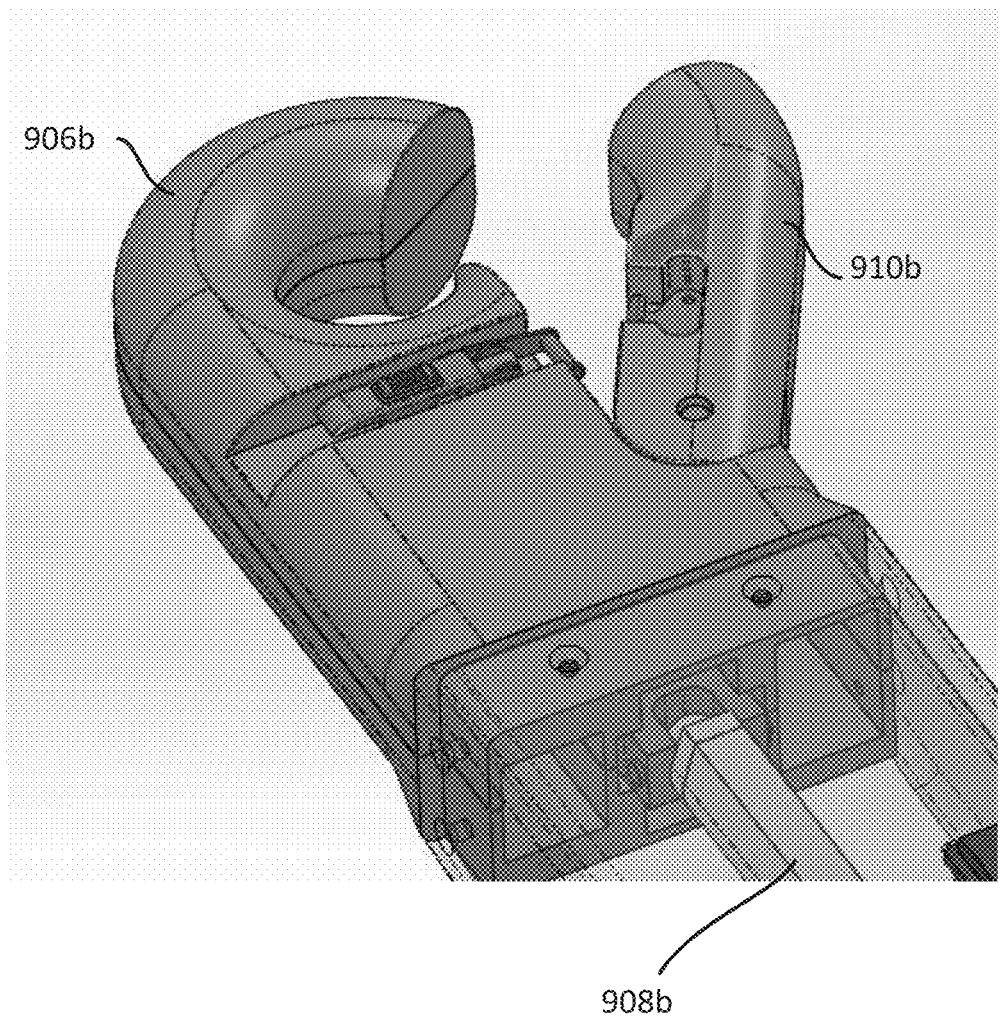
FIG. 10 illustrates an arm of a kite guide device in an open configuration.

FIG. 10 is a close up view of the second arm 906*b* and the second arm latch 910*b*. As shown in FIG. 10, the second arm latch 910*b* is in an open position, allowing the second arm 906*b* to grab or release an object (e.g., guide element, guide line).

It is noted that the guide device 600 and the guide device 900 include two arms. However, different implementations of the guide devices may have different numbers of arms (e.g., one arm, two arms, three arms, etc. . . . ) and/or different numbers of arm latches (e.g., one arm latch, two arm latches, three arm latches, etc. . . . ) to grab and release guide line(s) and/or guide element(s). The guide device 600 and the guide device 900 are configured to grab two guide elements and/or two guide lines.

Figure 11:
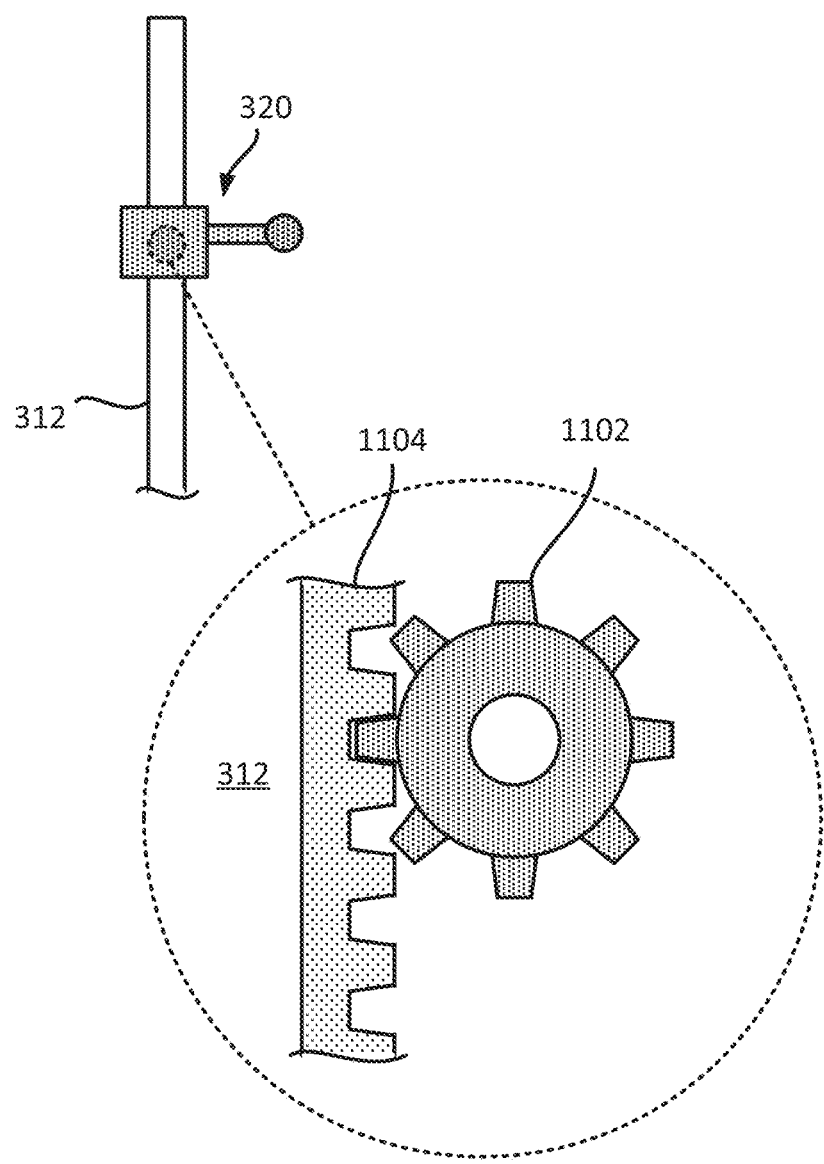
FIG. 11 illustrates an exemplary mechanism for moving the kite guide device.

FIG. 11 illustrates an example of how the guide device 320 may move along (e.g., up and down) the mast 312. In some implementations, the guide device 320 may include one or more gears 1102 coupled to a motor (not shown) that allows the guide device 320 to move along a track 1104 that includes slots for the teeth of the gears 1102. The motor coupled to the gear 1102 may be coupled to the guide device 320. The track 1104 may be coupled to the mast 312. However, the track 1104 may be part of the mast 312 or a separate component from the mast 312.

Figure 12:
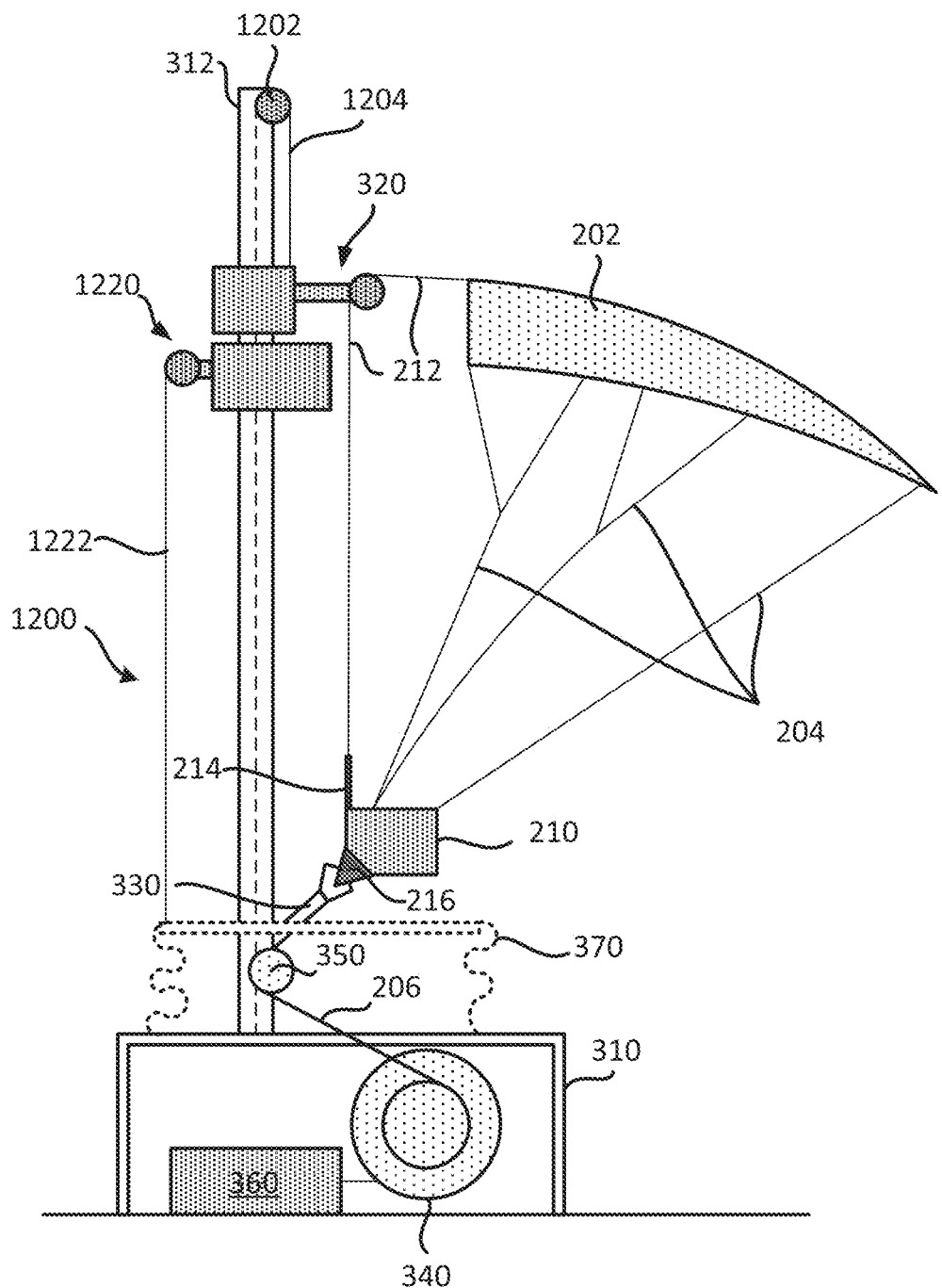
FIG. 12 illustrates another kite launch and recovery device.

FIG. 12 illustrates another kite launch and recovery device 1200. The kite launch and recovery device 1200 is similar to the kite launch and recovery device 300. In some implementations, the kite launch and recovery device 1200 operates in a similar manner as the kite launch and recovery device 300.

As shown in FIG. 12, the kite launch and recovery device 1200 includes a first pulley 1202 and a line 1204. The line 1204 is coupled to the guide device 320 and a winch (not shown). In some implementations, the pulley 1202, the line 1204 and the winch (not shown) are used to move the guide device 320 along the mast 312.

FIG. 12 also illustrates that the kite launch and recovery device 1200 includes a pulley device 1220. The pulley device 1220 may include a motor (not shown) that pulls and releases a line 1222 that is coupled to the shroud 370.

It is noted that different components and/or elements of the disclosure may be combined, replaced and/or changed. Having described various components of a kite launch and recovery device, a controller that can automate the process of launching and recovering a kite will now be described below.

Exemplary Kite Launch and Recovery Device Controller

Figure 13:
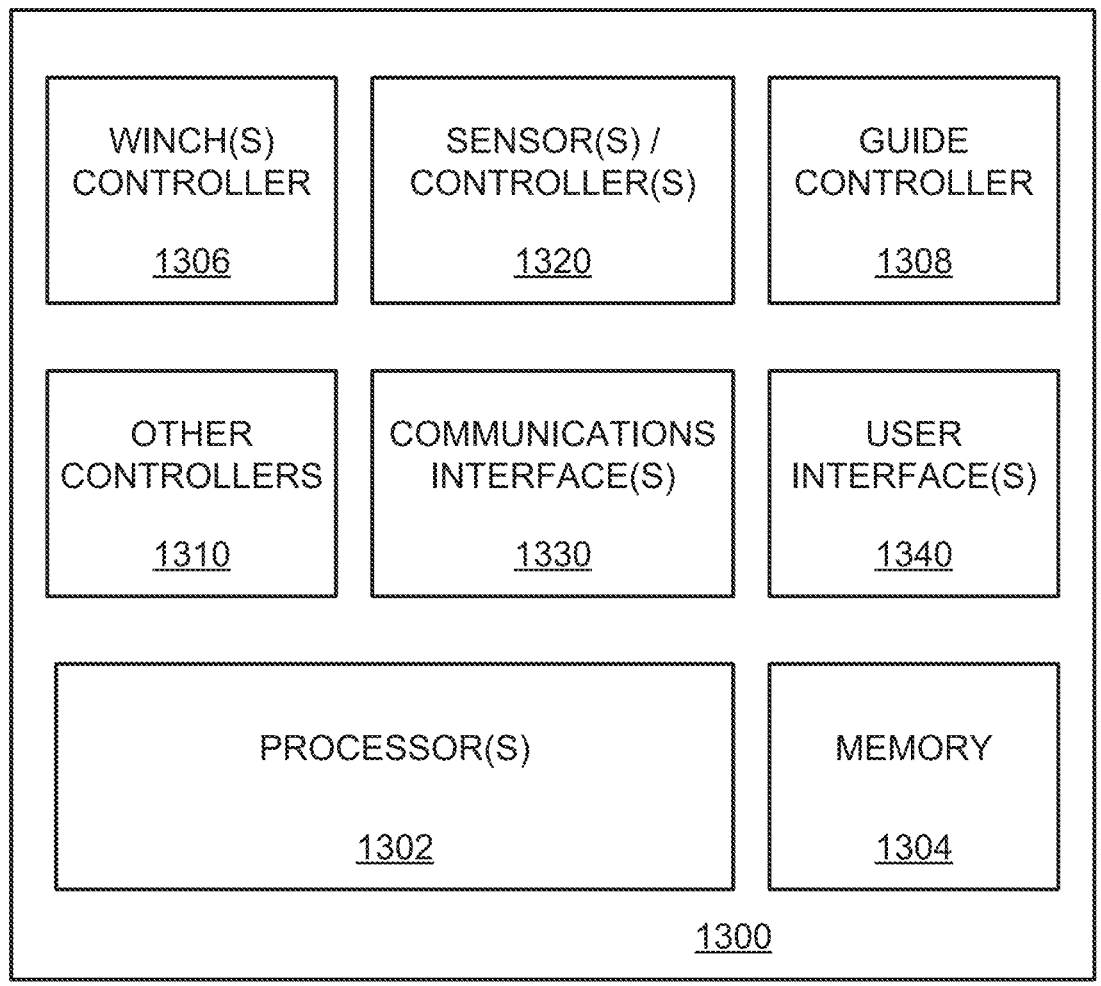
FIG. 13 illustrates various components of a controller for a kite launch and recovery device.

FIG. 13 illustrates a conceptual illustration of the functionalities a controller 1300 for the kite launch and recovery device may have. The controller 1300 may be used to perform automated operations of the kite launch and recovery device 300 and/or devices located on the base structure 210. In some implementations, the controller 1300 may be part of the kite 200. In some implementations, there may be several controllers 1300 that may be located in different locations of the kite launch and recovery device 300. In some implementations, the controller 1300 is a conceptual example of the controller 360. The controller 1300 may be implemented as hardware (e.g., processor, die, integrated device), software (e.g., non-transitory processor readable medium), and/or combinations thereof, in one or more devices (e.g., processor, chip, computer, tablet, mobile devices).

As shown in FIG. 13, the controller 1300 includes at least one processor 1302, at least one memory 1304, at least one winch controller 1306, at least one guide controller 1308, other controllers 1310, at least one sensor controller 1320, at least one communications interface 1330 and at least one user interface 1340. In some implementations, the above functions may be implemented in one or more controllers, devices, dies and/or integrated devices.

The processor 1302, the memory 1304 and/or combinations thereof, may be configured to process or perform operations with the at least one winch controller 1306, the at least one guide 1308, the controllers 1310, the at least one sensor controller 1320, the at least one communications interface 1330 and/or the at least one user interface 1340. The winch controller 1306 is configured to control the operation of the winch 340. In some implementations, the winch controller 1306 controls a motor coupled to the winch 340. The winch controller 1306 may configure the winch 340 to release the tether 206, which enables the kite 200 to be launched. The winch controller 1306 may configure the winch 340 pull back the tether 206, which causes the kite 200 to be retrieved towards the docking station 330. The winch controller 1306 may be configured to put the winch 340 in locked position. The winch controller 1306 may be in communications with the sensors (e.g., tension meter, length meter, position meter) and/or the sensor controller 1320 to properly launch and recovery the kite 200.

The guide controller 1308 is configured to control and operate a guide device (e.g., 320, 600, 900). The guide controller 1308 may configure the guide device to move along the length of (e.g., up and down) the mast (e.g., 312) and/or rotate about the mast. The guide controller 1308 may configure the guide device to open and close arms of the guide device.

The controller 1300 may include other controllers 1310 which are configured to configure and/or process other operations of other devices from the kite launch and recovery device 300. For example, the controller 1310 may include one or more controllers to control the position of the shroud 370, control a pulley device and/or lower the mast 312. The controller 1310 may include one or more controllers for controlling how the kite 200 (e.g., canopy 202) aligns with the wind.

The communications interface 1330 may include different interfaces to communicate with different devices (e.g., sensors) and/or components. The communications interface 1330 may include a bus interface, a wired interface, wireless interface (e.g., Wireless Fidelity (WIFI), Bluetooth, radio, etc. . . . ), and/or an optical interface.

The user interface 1340 allows an operator to control and monitor the operation of the kite launch and recovery device 300 remotely. For example, the user interface 1340 may allow an operator to remotely launch the kite 200 and/or remotely return the kite 200 to the docking station 330. The user interface 1340 may also allow an operator to remotely control devices (e.g., sensor, camera, antenna) coupled to the base structure 210, even when the kite 200 is fully deployed. However, it is noted that the launch and recovery of the kite 200 may be determined by the controller through the use of sensors and/or timers. For example, the kite 200 may be configured to launch at a particular time and/or location and returned back at a particular time, after a time has elapsed and/or when a location has been reached.

One or more of the components, processes, features, and/or functions illustrated in FIGS. 2-4, 5A-5K and/or 6-13 may be rearranged and/or combined into a single component, process, feature or function or embodied in several components, processes, or functions. Additional devices, elements, components, processes, and/or functions may also be added without departing from the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is noted that the term "grabbing" an object shall include encircling an object. Thus, grabbing an object does not necessarily mean physically touching the object.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. Any of the above methods and/or processes may also be code that is stored in a computer/processor readable storage medium that can be executed by at least one processing circuit, processor, die and/or controller. For example, the controller may include one or more processing circuits that may execute code stored in a computer/processor readable storage medium. A computer/processor readable storage medium may include a memory (e.g., memory die, memory in a logic die, memory controller). A die may be implemented as a flip chip, a wafer level package (WLP), and/or a chip scale package (CSP).

Those of skill in the art would further appreciate that the various illustrative logical blocks, modules, circuits, and algorithm steps described in connection with the embodiments disclosed herein may be implemented as electronic hardware, computer software, and/or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different devices and/or systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A kite launch device comprising:
    a kite comprising:
        a canopy;
        a base structure for at least one device;
        a plurality of support lines coupled to the canopy and the base structure;
        a guide line coupled to the canopy; and
        a tether coupled to the base structure;
    a mast;
    a guide device coupled to the mast,
        wherein the guide device is configured to grab the guide line, and
        wherein the guide device is configured to release the guide line when the canopy is substantially expanded; and
    a winch coupled to the tether of the kite, wherein the winch is configured to extend and retract the tether.

2. The kite launch device of claim 1, wherein the kite comprises a guide element coupled to the base structure and the guide line.

3. The kite launch device of claim 2, wherein the guide device is configured to encircle the guide element in order to grab the guide line.

4. The kite launch device of claim 3, wherein at least one of the at least one device comprises a sensor, a detector, a camera and/or an antenna.

5. The kite launch device of claim 1, wherein the winch includes a brake for locking the winch in a particular position.

6. The kite launch device of claim 1, wherein prior to launch, the kite can be rotated so that the canopy of the kite substantially faces the wind.

7. The kite launch device of claim 6, wherein the kite can be rotated by rotating the mast and/or by rotating the guide device.

8. The kite launch device of claim 6, wherein the kite can be rotated by rotating the kite launch device.

9. The kite launch device of claim 1, wherein the kite launch device is implemented on an aircraft, a vessel, and/or a vehicle.

10. The kite launch device of claim 1, further comprising a docking station configured to couple to a docking coupler of the kite, wherein the tether is coupled to base structure by being coupled to the docking coupler.

11. The kite launch device of claim 10, wherein the docking station and the docking coupler are configured such that the kite is docked in a particular position when the kite is stowed.

12. The kite launch device of claim 11, wherein the winch is configured to recover the kite by pulling the tether such that the docking coupler is moving towards the docking station.

13. The kite launch device of claim 1, wherein the tether includes at least one wire, at least one electrical wire, and/or at least one optical fiber.

14. The kite launch device of claim 1, wherein the guide device comprises a first arm and a first arm latch such that the first arm and the first arm latch are configured to grab the guide line.

15. The kite launch device of claim 14, wherein the guide device further comprises a second arm and a second arm latch such that the second arm and the second arm latch are configured to grab a second guide line that is coupled to the canopy.

16. The kite launch device of claim 1, further comprising a shroud for at least partially covering the kite, wherein the shroud is moveable along a length of the mast.

17. The kite launch device of claim 1, wherein the canopy is considered substantially expanded when there is a minimum amount of tension in the winch, the tether and/or the support lines.

18. The kite launch device of claim 17, wherein the minimum amount of tension is at least equal to the amount of weight the kite is configured to lift.

19. The kite launch device of claim 1, further comprising a controller configured to control the guide device and the winch, wherein the controller controls when the guide device grabs and/or releases the guide line.

20. The kite launch device of claim 1, further comprising a docking station,
wherein the kite comprises (i) a guide element coupled to the base structure and the guide line, and (ii) a docking coupler coupled to the base structure,
wherein the tether being coupled to the base structure comprises the tether being coupled to the docking coupler,
wherein the guide device is moveable along a length of the mast,
wherein the guide device is configured to encircle the guide element in order to grab the guide line,
wherein the docking station is configured to be coupled to the docking coupler of the kite,
wherein the docking station and the docking coupler are configured such that the kite is docked in a particular position when the kite is stowed.

21. A method for launching a kite, comprising:
positioning, by a kite launch device, a kite comprising a canopy such that the canopy at least substantially faces a wind;
determining, by a controller of the kite launch device, that the kite has substantially expanded;
releasing, by a guide device, a guide line of the kite; and
extending, by a winch, a tether coupled to the kite to launch the kite.

22. The method of claim 21, further comprising locking the winch so that the length of the tether is fixed.

23. The method of claim 21, further comprising retracting the tether to retract the kite towards the kite launch device.

24. The method of claim 23, further comprising grabbing, by the guide device, the guide line of the kite.

25. The method of claim 24, wherein grabbing the guide line comprises grabbing a guide element of the kite.

26. The method of claim 24, further comprising moving the guide line in an upwards direction by moving the guide device along a mast of the kite launch device to stow the kite.

27. The method of claim 26, wherein the guide device comprises an arm and an arm latch to grab and move the guide line.

28. The method of claim 21, wherein the tether is coupled to a docking coupler of the kite.

29. The method of claim 28, wherein the docking coupler is coupled to a docking station of the kite launch device prior to the guide device releasing the guide line.

30. The method of claim 21, wherein positioning the kite comprises rotating the guide device.

* * * * *